United States Patent
Bryant et al.

(10) Patent No.: US 11,827,077 B2
(45) Date of Patent: Nov. 28, 2023

(54) COOLING SYSTEM AND METHODS FOR COOLING INTERIOR VOLUMES OF CARGO TRAILERS

(71) Applicant: RSC Industries Inc., Troy, MI (US)

(72) Inventors: Eric William Bryant, Nunica, MI (US); Edward John Bratkowski, Bruce Township, MI (US); Andrew D. Frost, Rochester Hills, MI (US); Fred Jackson Norvell, III, Clarkston, MI (US); James Madison Reid, Charlotte, NC (US); Robert C. Rabine, Shelby Township, MI (US); Paul M. Walling, Rochester Hills, MI (US); Thomas Zagotta, South Lyon, MI (US); Robert S. Rau, Ypsilanti, MI (US)

(73) Assignee: RSC INDUSTRIES INC., Troy, MI (US)

( * ) Notice: Subject to any disclaimer, the term of this patent is extended or adjusted under 35 U.S.C. 154(b) by 0 days.

(21) Appl. No.: 17/152,208

(22) Filed: Jan. 19, 2021

(65) Prior Publication Data
US 2021/0379963 A1    Dec. 9, 2021

Related U.S. Application Data

(63) Continuation of application No. 16/898,862, filed on Jun. 11, 2020, now abandoned, which is a
(Continued)

(51) Int. Cl.
*B60H 1/00*    (2006.01)
*B60H 1/32*    (2006.01)
(Continued)

(52) U.S. Cl.
CPC ..... *B60H 1/00964* (2013.01); *B60H 1/00014* (2013.01); *B60H 1/32* (2013.01);
(Continued)

(58) Field of Classification Search
CPC ....... F24F 11/30; F24F 11/52; B60H 1/00364; B60H 1/00964; B60H 1/00014; B60H 1/32; B60H 1/3202; F25D 29/001
See application file for complete search history.

(56) References Cited

U.S. PATENT DOCUMENTS 3,464,222 A    9/1969   Gramse
3,735,805 A *  5/1973   Stillhard ............... B29C 45/72
                                                    165/206

(Continued)

FOREIGN PATENT DOCUMENTS

CN    1107222 A    8/1995
CN    1800735 A *  7/2006 ............ F24F 1/0014
(Continued)

OTHER PUBLICATIONS

International Preliminary Report on Patentability (International Application No. PCT/US2013/047625; dated Jan. 8, 2015.
(Continued)

*Primary Examiner* — Nelson J Nieves
(74) *Attorney, Agent, or Firm* — Endurance Law Group, PLC; James Yee

(57) ABSTRACT

A system for controlling a temperature a within an interior volume of a cargo trailer adapted to transport perishable goods is described herein. The system includes a fluid distribution assembly and a monitoring system. The fluid distribution assembly is configured to selectively channel a flow of cryogenic cooling fluid into the cargo trailer interior volume to facilitate adjusting a temperature within the interior volume. The monitoring system includes at least one
(Continued)

sensor for sensing an environmental parameter of the cargo trailer, and a controller coupled to the sensor and to the fluid distribution assembly. The controller is configured to receive a monitoring signal indicative of the sensed environmental parameter, determine an environmental condition of the cargo trailer as a function of the environmental parameter, and provide a notification signal if the determined environmental condition is different than a predefined environmental condition.

20 Claims, 6 Drawing Sheets

Related U.S. Application Data continuation of application No. 15/916,122, filed on Mar. 8, 2018, now Pat. No. 10,710,430, which is a continuation of application No. 13/926,728, filed on Jun. 25, 2013, now Pat. No. 9,950,590.

(60) Provisional application No. 61/664,075, filed on Jun. 25, 2012.

(51) Int. Cl.
*F25D 29/00* (2006.01)
*F24F 11/30* (2018.01)
*F24F 11/52* (2018.01)
*F24F 110/00* (2018.01)

(52) U.S. Cl.
CPC ............ *B60H 1/3202* (2013.01); *F24F 11/30* (2018.01); *F24F 11/52* (2018.01); *F25D 29/001* (2013.01); *F24F 2110/00* (2018.01)

(56) References Cited

U.S. PATENT DOCUMENTS

| | | | | |
|---|---|---|---|---|
| 3,905,216 A * | 9/1975 | Hinrichsen | ............. | B21B 37/76 72/12.2 |
| 4,060,400 A | 11/1977 | Williams | | |
| 4,269,439 A | 5/1981 | Warwick et al. | | |
| 5,025,767 A * | 6/1991 | Kume | ................ | G01N 27/4065 60/276 |
| 5,507,239 A | 4/1996 | Basinski | | |
| 5,507,539 A * | 4/1996 | Basinski | ................. | E05B 81/64 292/DIG. 32 |
| 6,062,482 A * | 5/2000 | Gauthier | ............ | G05D 23/1919 236/78 D |
| 6,130,611 A * | 10/2000 | Pellaton | ................. | G08B 29/22 340/541 |
| 6,345,509 B1 * | 2/2002 | Garlov | ..................... | A23L 3/36 62/62 |
| 7,005,985 B1 * | 2/2006 | Steeves | .............. | G06K 7/10108 340/5.2 |
| 9,110,462 B2 * | 8/2015 | Bourg, Jr. | ......... | G05B 19/41865 |
| 2002/0121962 A1 * | 9/2002 | Wolfe | ..................... | G07C 9/38 340/425.5 |
| 2003/0187549 A1 * | 10/2003 | Bohrer | ................... | G05B 15/02 165/200 |
| 2005/0179546 A1 * | 8/2005 | Lanigan | .................... | G07C 9/38 340/584 |
| 2007/0022772 A1 | 10/2007 | Springer et al. | | |
| 2007/0227721 A1 * | 10/2007 | Springer | ............ | G05D 23/1931 165/291 |
| 2008/0036238 A1 * | 2/2008 | Weeda | ...................... | B60P 3/20 296/146.1 |
| 2008/0133065 A1 * | 6/2008 | Cannon | ................. | H04L 67/125 700/295 |
| 2008/0272923 A1 | 11/2008 | Breed | | |
| 2008/0315596 A1 * | 12/2008 | Terry | .................... | G09F 3/0317 709/250 |
| 2009/0015400 A1 * | 1/2009 | Breed | ..................... | G07C 9/28 340/539.22 |
| 2009/0299530 A1 * | 12/2009 | Burnham | ................ | F25B 27/00 62/236 |
| 2010/0039222 A1 * | 2/2010 | Vincent | .............. | G07C 9/00309 340/5.72 |
| 2010/0132166 A1 | 6/2010 | Vargas | | |
| 2010/0141430 A1 * | 6/2010 | Steer | ..................... | G06Q 10/08 340/539.13 |
| 2010/0253519 A1 * | 10/2010 | Brackmann | ............... | B60P 3/03 340/572.1 |
| 2011/0232307 A1 * | 9/2011 | Pickup | .................... | F25D 3/105 62/118 |
| 2012/0016524 A1 * | 1/2012 | Spicer | .................... | G05B 15/02 700/276 |
| 2012/0046859 A1 * | 2/2012 | Imes | ................. | H02J 13/00001 715/835 |
| 2013/0276488 A1 * | 10/2013 | Haber | ..................... | E05B 81/66 70/57.1 |
| 2013/0279386 A1 * | 10/2013 | Sanders | .................. | B60R 16/03 370/311 |

FOREIGN PATENT DOCUMENTS

| | | | |
|---|---|---|---|
| DE | 10 2007 015 390 A1 | 10/2008 | |
| DE | 102008020366 A1 * | 1/2009 | ......... B60H 1/00735 |
| EP | 0 657 107 A1 | 6/1995 | |
| FR | 2 932 721 A1 | 12/2009 | |
| GB | 2 275 098 A | 8/1994 | |
| SU | 1204888 A | 1/1986 | |
| WO | 2011/126581 A2 | 10/2011 | |
| WO | WO-2011146230 A2 * | 11/2011 | ............ F25D 29/003 |

OTHER PUBLICATIONS

First Office Action (CN Patent Application No. 20130043925.8); dated Apr. 6, 2016; Includes English Translation.
Patent Examination Report No. 1 (AU Patent Application No. 2013280511; dated Jul. 8, 2016.
Second Office Action (CN Application No. 201380043925.8); dated Dec. 2, 2016; Includes English Translation.
Notification to Go through Formalities of Registration (CN Application No. 201380043925.8); dated Jun. 2, 2017; Includes English Translation.
Examiner's Report (CA Application No. 2,877,620; dated Jun. 20, 2018.

* cited by examiner

COOLING SYSTEM AND METHODS FOR COOLING INTERIOR VOLUMES OF CARGO TRAILERS

CROSS-REFERENCE TO RELATED APPLICATIONS

This application is a continuation of U.S. patent application Ser. No. 16/898,862, filed Jun. 11, 2020, which is a continuation of U.S. patent application Ser. No. 15/916,122, filed Mar. 8, 2018 (now U.S. Pat. No. 10,710,430, issued Jul. 14, 2020), which is a continuation of U.S. patent application Ser. No. 13/926,728, filed Jun. 25, 2013 (now U.S. Pat. No. 9,950,590, issued Apr. 24, 2018), which claims the benefit of U.S. Provisional Application No. 61/664,075, filed Jun. 25, 2012, the disclosures of which are incorporated herein by reference.

TECHNICAL FIELD

The subject matter disclosed herein relates generally to refrigerated cargo trailers and more particularly, to a cooling system and methods for cooling interior volumes of cargo trailers.

BACKGROUND OF THE INVENTION

To facilitate the transportation of perishable goods, cargo vessels such as, for example, truck trailers and/or containers include a trailer refrigeration unit (TRU) to maintain the temperature of the cargo compartment at the desired temperature. Products at risk of damage from elevated ambient temperature may be maintained at "room temperature" (approximately 20° C./68° F.), while refrigerated goods are typically held slightly above the freezing point (1° C./35° F.), and frozen products may be stored at a variety of temperature set points between −15° C./0° F. and −30° C./−20° F. The cargo may contain a variety of consumer products such as produce, frozen and refrigerated meat, dairy, candy, pharmaceuticals, and flowers.

Contemporary TRUs with diesel-powered compressor systems provide the required cooling performance, but are becoming less attractive from an economic standpoint due to the cost of maintenance, fueling, and regulatory compliance. Additionally, society places substantial pressure on the users of TRUs to reduce environmental impact, particularly in urban areas where noise and exhaust emissions are perceived to be especially problematic.

To provide an alternative method of cargo cooling with fewer environmental drawbacks than diesel TRUs, a cryogenic cooling system (CCS) utilizes the stored thermal energy of liquid nitrogen ($LN_2$) for the purpose of maintaining cargo temperature. Two general types of CCS may be employed—"direct" systems where the $LN_2$ is dispersed directly into the cargo compartment, and "indirect" systems that use an evaporator (similar to that of compressor-based system) and circulating fans to transfer heat from the cargo into the cooling medium.

The direct method of injecting $LN_2$ is preferred due to its superior efficiency as compared to indirect systems—nearly all of the potential heat energy absorption of the cooling medium is realized through direct interaction between the $LN_2$ and the cargo, and no defrost cycles are required to remove ice from an evaporator (icing can occur whenever the evaporator surface temperature is lower than the freezing point of water and moisture is present in the air). Since fuel is necessarily limited by the size of the $LN_2$ vessel and thus efficiency is an important parameter in maximizing the utility of this system, direct systems can have a significant advantage in energy efficiency. Additionally, as direct $LN_2$ systems do not require the use of circulation fans during the cooling cycle, they have lower electrical power consumption during the cooling cycle (important as the trailer is often not connected to a tractor or shore power during the lengthy loading and staging process), substantially lessened noise emissions, and) and decreased drying of food.

Some refrigerated vehicles may include direct $LN_2$ systems that distribute $LN_2$ through a spray tube arrangement, and simultaneously through an evaporator arrangement. The $LN_2$ flows through the evaporator arrangement and is converted to gaseous nitrogen which is used to drive a fan for drawing air into the space to achieve environmental control. However, the introduction of liquid nitrogen directly into the enclosed trailer space presents a safety risk to operators because of the possibility of entering an atmosphere that contains dangerous levels of gaseous nitrogen. For example, as the liquid nitrogen is sprayed within the space, air is drawn into the space, however, serious safety risks are present due to the significant amount of gaseous nitrogen occupying the space.

Accordingly, new features are necessary to improve the safety and monitoring of refrigerated vehicles that include cryogenic cooling systems to reduce the potential health risks exposed to a vehicle operator when operating the refrigerated vehicles and loading and unloading products from the refrigerated trailers. The present invention is directed to satisfying these needs.

SUMMARY OF THE INVENTION

In one aspect of the present invention, a system for controlling a temperature a within an interior volume of a cargo trailer adapted to transport perishable goods is provided. The system includes a fluid distribution assembly and a monitoring system operatively coupled to the fluid distribution assembly for selectively channeling a flow of cryogenic cooling fluid into the cargo trailer interior volume to facilitate adjusting a temperature within the interior volume. The monitoring system includes at least one sensor for sensing an environmental parameter of the cargo trailer, and a controller coupled to the sensor and to the fluid distribution assembly. The controller is configured to receive a monitoring signal indicative of the sensed environmental parameter, determine an environmental condition of the cargo trailer as a function of the environmental parameter, and provide a notification signal if the determined environmental condition is different than a predefined environmental condition.

In another aspect of the present invention, a monitoring system for use in controlling a temperature a within an interior volume of a cargo trailer adapted to transport perishable goods is provided. The cargo trailer includes a fluid distribution assembly for channeling a flow of cryogenic cooling fluid into the cargo trailer interior volume to facilitate adjusting a temperature within the interior volume. The monitoring system includes at least one sensor for sensing an environmental parameter of the cargo trailer and a controller coupled to the sensor and to the fluid distribution assembly. The controller is configured to receive, from the at least one sensor, a monitoring signal indicative of the sensed environmental parameter, determine an environmental condition of the cargo trailer as a function of the environmental parameter, and provide a notification signal if the determined environmental condition is different than a predefined environmental condition.

In yet another aspect of the present invention, a method of controlling a temperature a within an interior volume of a cargo trailer is provided. The cargo trailer includes a fluid distribution assembly for channeling a flow of cryogenic cooling fluid into the cargo trailer interior volume. The method includes receiving, from a sensor, a monitoring signal indicative of a sensed environmental parameter, determining an environmental condition of the cargo trailer as a function of the environmental parameter, and providing a notification signal to an operator if the determined environmental condition is different than a predefined environmental condition.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
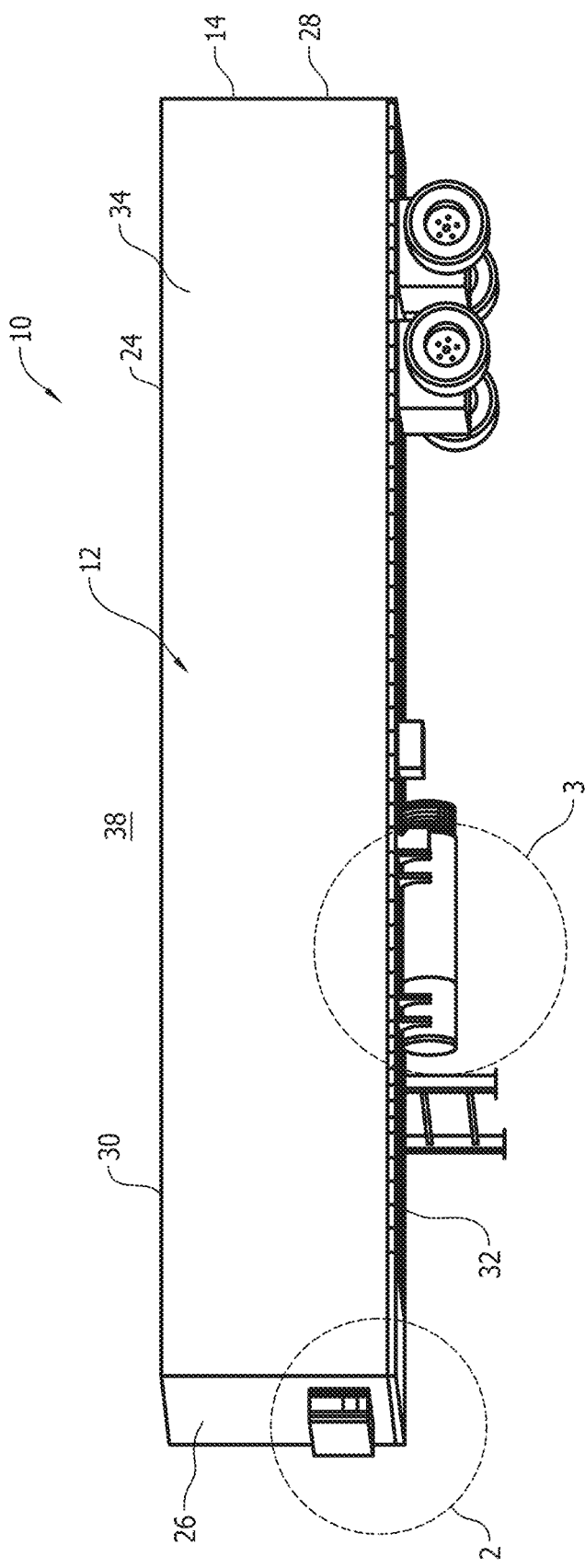
FIG. 1 is a perspective view of an exemplary system that may be used for controlling a temperature within an interior volume of a cargo trailer, according to an embodiment of the present invention.
Figure 2:
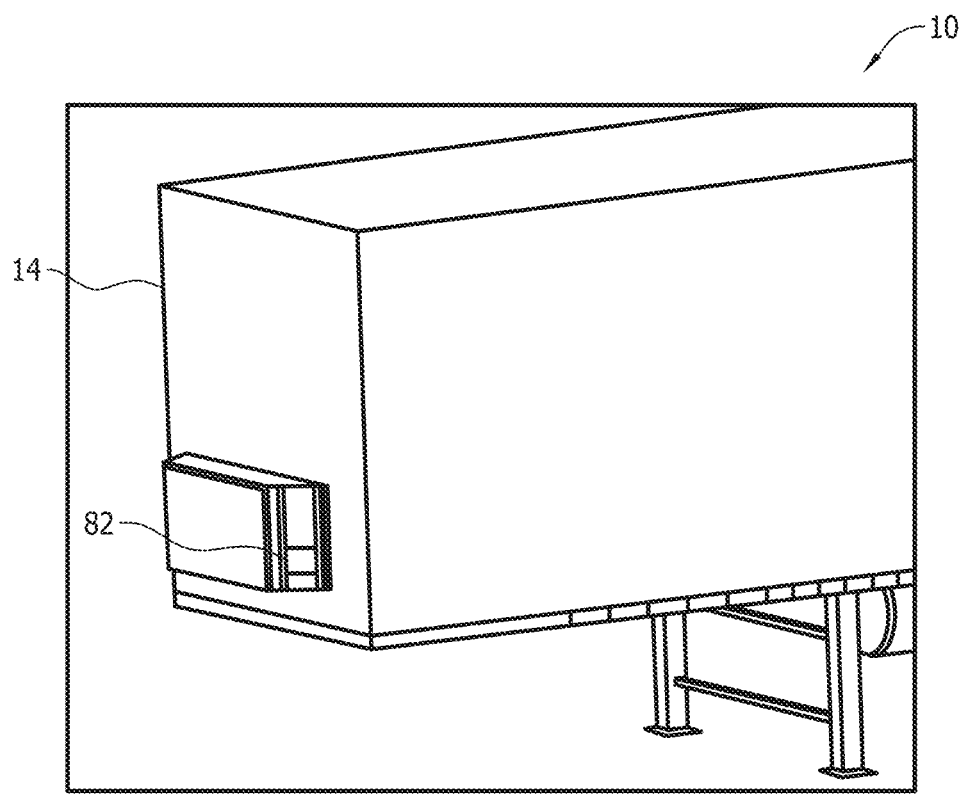
FIG. 2 is a perspective view of a portion of the system shown in Figure 1and taken along area 2.
Figure 3:
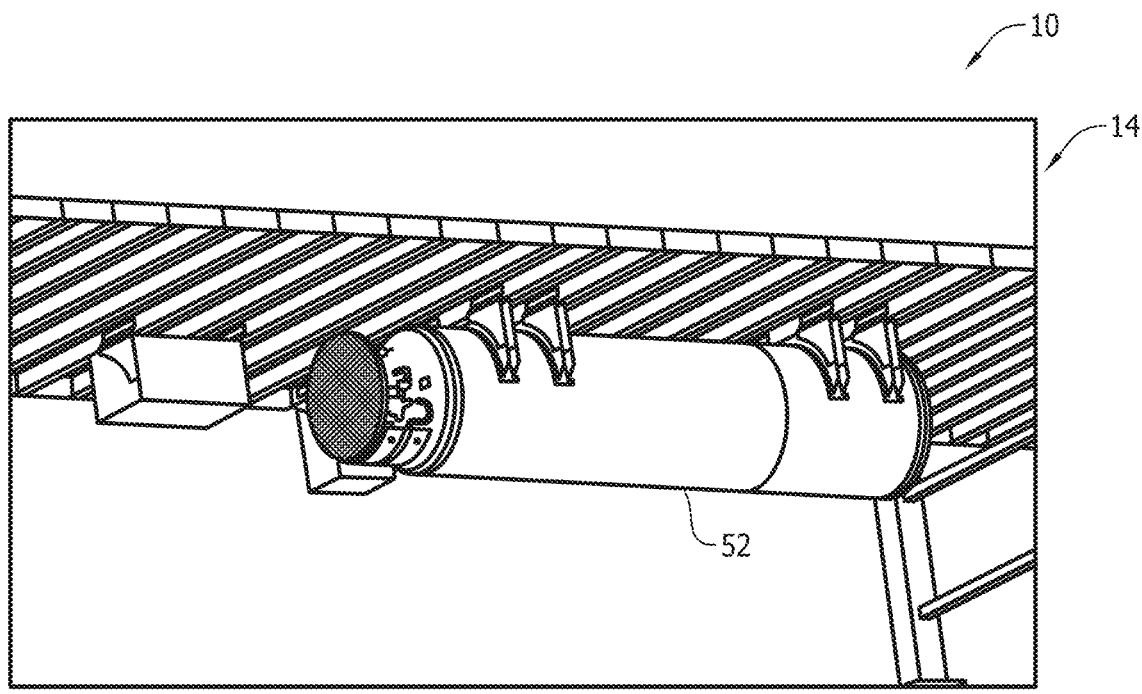
FIG. 3 is a perspective view of a portion of the system shown in FIG. 1 and taken along area 3.
Figure 4:
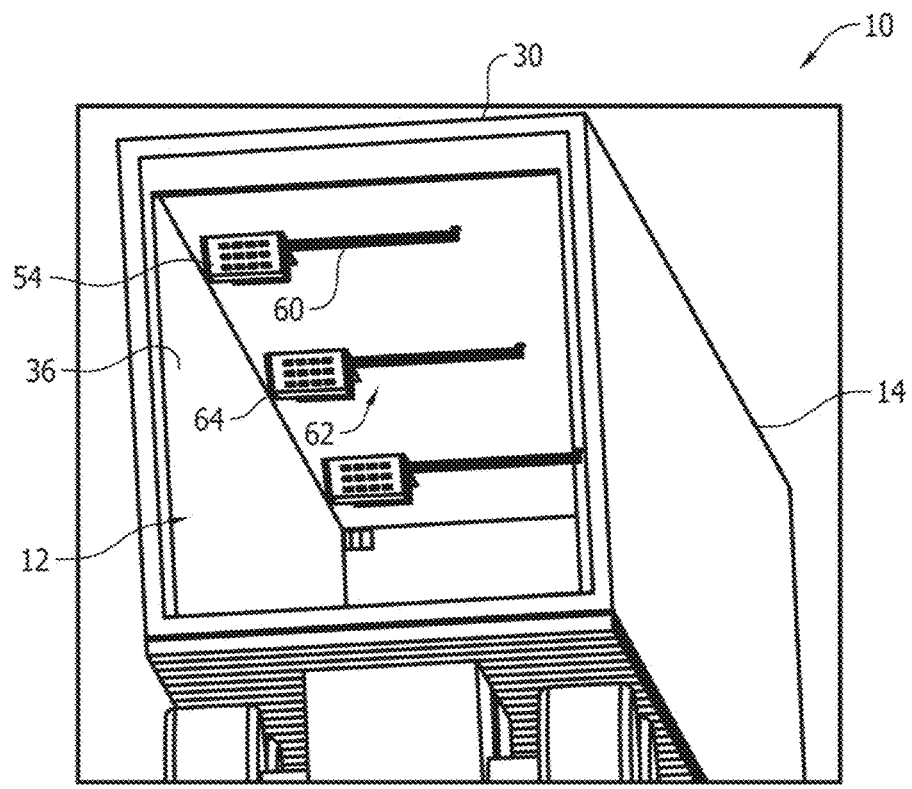
FIG. 4 is a perspective view of an interior volume of a cargo trailer including a portion of the system shown in FIG. 1, according to an embodiment of the present invention.
Figure 5:
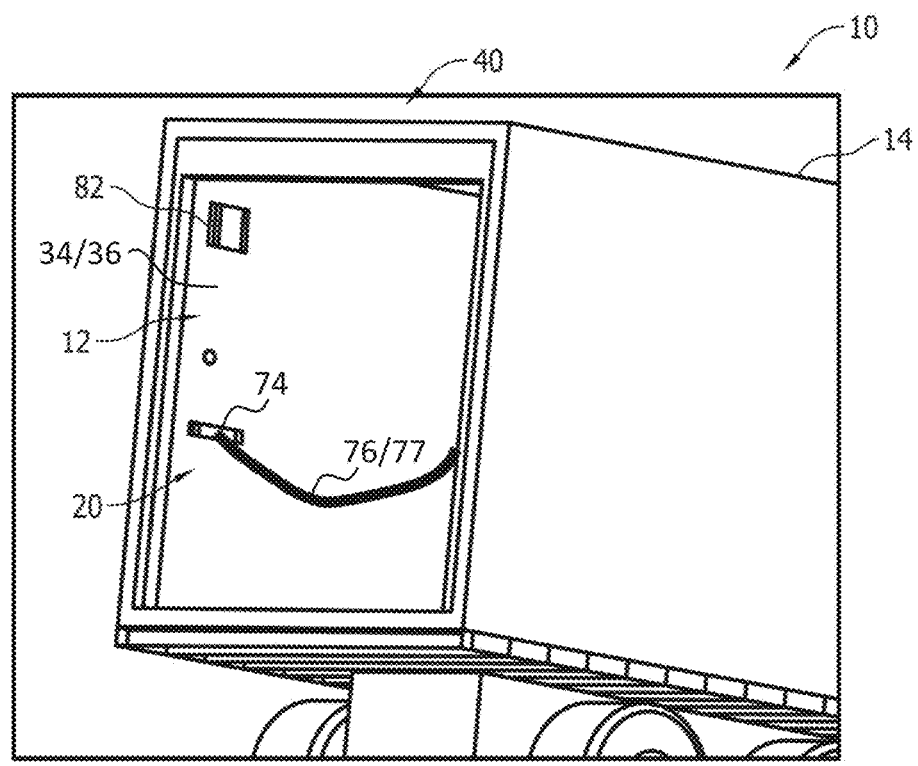
FIG. 5 is another perspective view of the cargo trailer shown in FIG. 4.

With reference to the drawings and in operation, the present invention overcomes at least some of the disadvantages of known trailer refrigeration systems by providing a system that includes a monitoring system that determines an environmental condition of a cargo trailer and provides a notification to the operator if the environmental condition is hazardous to the operator. In addition, the monitoring system may restrict access to the cargo trailer based on the determined environmental condition. More specifically, the monitoring system will determine the environmental condition as a function of sensed environmental parameters such as, for example, temperature, pressure, oxygen levels, and/or nitrogen levels, and notify the operator if the determined environmental condition is different than a predefined environmental condition. In addition, the system includes fluid distribution assembly for channeling cryogenic cooling fluid into an interior volume of the cargo trailer to control an interior temperature. The monitoring system monitors the operation of the fluid distribution assembly and adjusts a flow of the cryogenic cooling fluid based on the sensed environmental parameters. By providing a system that monitors and controls an operation of a cryogenic cooling fluid distribution assembly, the health risks exposed to an operator is significantly reduced as compared to known refrigeration system. Thus, the cost of operating the trailer refrigeration system is reduced.

In general, the system 10 includes a cargo trailer for transporting products and/or cargo that are required to be maintained within a specific temperature range during transport of the cargo. For example, the system 10 may be adapted to transport cargo including refrigerated products such as, for example, medical supplies, food, perishable goods, farm products, flowers, commercial goods, and/or any suitable items that require a temperature controlled environment during transport. In the illustrated embodiment, the system 10 includes a cooling fluid distribution assembly for channeling cooling fluid into the cargo trailer to maintain a refrigerated space with the cargo trailer. The system 10 also includes a monitoring system that is adapted to monitor the condition of the cargo trailer and/or the cooling fluid distribution assembly and to notify an operator of the condition of the system 10. For example, in one embodiment, the monitoring system may notify the operator of an operating condition of the fluid distribution assembly. The monitoring system may also notify the operator of potential health risks present within the refrigerated space such as, for example, elevated levels of cooling fluid and/or reduced levels of breathable air within the refrigerated space. Moreover, the monitoring system may also adjust an operation of the fluid distribution assembly based on the monitored conditions of the refrigerated space and/or the fluid distribution assembly. In another embodiment, the system 10 may also include a heated space, wherein the monitoring system is adapted to monitor a condition of the heated space and notify the operator of the monitored condition.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

Figure 6:
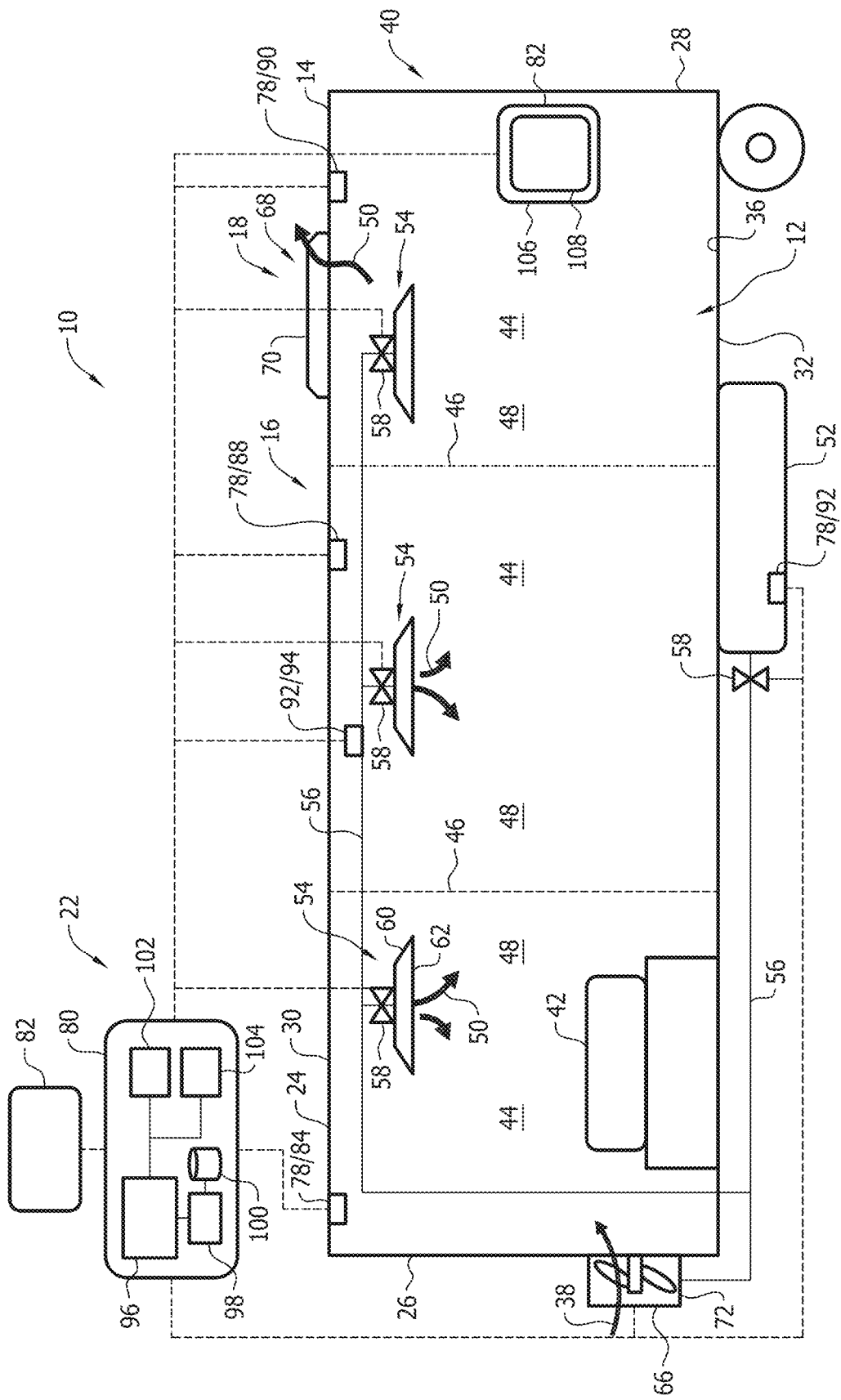
FIG. 6 is a schematic representation of the system shown in FIG. 1, according to an embodiment of the present invention.

FIG. 1 is a perspective view of a system 10 that may be used for controlling a temperature within an interior volume 12 of a cargo trailer 14. FIGS. 2-5 are perspective views of the system 10. FIG. 6 is a schematic representation of the system 10. In the illustrated embodiment, the system 10 includes a fluid distribution assembly 16 for channeling a flow of cooling fluid into the interior volume 12, a ventilation assembly 18 for discharging the cryogenic fluid from the interior volume 12, a cargo access assembly 20 to selectively provide access into the interior volume 12, and a monitoring system 22 operatively coupled to the fluid distribution assembly 16, the ventilation assembly 18, and the cargo access assembly 20.

In the illustrated embodiment, the cargo trailer 14 includes a body 24 that includes a front wall 26, a rear wall 28, a top wall 30, a bottom wall 32, and a pair of sidewalls 34 that extend between the front wall 26 and the rear wall 28, and between the top wall 30 and the bottom wall 32. Each wall 26-34 includes an inner surface 36 that defines the interior volume 12 therein. In addition, each wall 26-34 includes thermally insulated material (not shown) having an insulation value to facilitate preventing a transfer of heat between the interior volume 12 and ambient air 38 to thermally insulate the interior volume 12. The cargo trailer 14 also includes at least one access door 40 to selectively provide access to the interior volume 12 to enable loading an unloading of cargo 42 into the cargo trailer 14. In one embodiment, the interior volume 12 may include a plurality of thermally regulated zones 44 extending between the front wall 26 and the rear wall 28, and may include a different ambient temperature within each zone 44. In addition, the cargo trailer 14 may include a plurality of dividers 46 positioned between each of the plurality of zones 44 to define a plurality of compartments 48 within the interior volume 12. In one embodiment, each divider 46 may be removable coupled to the inner surface 36 to enable an operator to selectively couple each divider 46 within the cargo trailer 14 to adjust a volume defined by each compartment 48 and/or a number of compartments 48 defined within the interior volume 12. In one embodiment, the dividers 46 may include thermal insulation material to facilitate thermally isolating adjacent compartments 48 and/or zones 44. In another embodiment, the dividers 46 may be configured to provide a thermal differential and/or an air pressure differential between adjacent zones 44. In addition, the dividers 46 may include, but are not limited to including, a wall, a partition, a curtain, a fence, and air curtain, and/or any suitable divider that enables each zone and/or compartment to include an independently regulated ambient temperature.

In the illustrated embodiment, the cargo trailer 14 is configured to be coupled to a vehicle such as, for example, a truck (not shown) for transporting the cargo trailer 14. In another embodiment, the cargo trailer 14 may in integrally formed with the vehicle. In addition, the cargo trailer 14 may be configured to be transported by ship, railcar, airplane, and/or any suitable vehicle for transporting the cargo trailer 14.

In the illustrated embodiment, the fluid distribution assembly 16 is coupled to the cargo trailer 14 and adapted to channel a flow of cooling fluid, represented by arrow 50, into the interior volume 12 of the cargo trailer 14 to selectively adjust an ambient temperature within the interior volume 12 to facilitate maintaining a temperature of the cargo 42. In the illustrated embodiment, the fluid distribution assembly 16 is configured to channel a flow of cryogenic fluid 50 such as for example liquid nitrogen. The cryogenic fluid 50 may be in a liquid phase, a gaseous phase, and/or a liquid-gaseous phase. In one embodiment, the fluid distribution assembly 16 may channel any suitable cooling fluid such, for example or liquid carbon dioxide ($CO_2$) and/or any other suitable liquid cryogen. In the illustrated embodiment, the fluid distribution assembly 16 includes a cryogenic fluid supply tank 52 that is coupled to the cargo trailer 14 for storing a volume of cryogenic fluid 50, a plurality of spray nozzle assemblies 54 positioned within the interior volume 12 for discharging a flow of cryogenic fluid 50 into the interior volume 12, and at least one fluid conduit 56 that is coupled between the cryogenic fluid supply tank 52 and the spray nozzle assemblies 54 for channeling the cryogenic fluid 50 from the cryogenic fluid supply tank 52 to each of the spray nozzle assemblies 54. A plurality of control valves 58 are coupled to the fluid conduit 56 and/or the spray nozzle assemblies 54 for selectively channeling a flow of cryogenic fluid 50 to the interior volume 12 through the spray nozzle assemblies 54. In one embodiment, the control valves 58 may be positioned adjacent to each spray nozzle assembly 54. In another embodiment, the control valves 58 may be positioned adjacent to the fluid supply tank 52 and/or positioned at any location within the cargo trailer 14 that enables the system 10 to function as described herein.

In the illustrated embodiment, the spray nozzle assemblies 54 are mounted to the inner surface 36 of the top wall 30 and are positioned within the interior volume 12. Each spray nozzle assembly 54 is configured to facilitate a cryogenic fluid phase change within the cryogenic fluid 50 from a liquid cryogenic fluid to a gaseous cryogenic fluid and to discharge the gaseous cryogenic fluid 50 into the interior volume 12 and to facilitate adjusting an ambient temperature within the interior volume 12. In one embodiment, the system 10 may include a spray nozzle assembly 54 positioned within each zone 44 to independently adjust an ambient temperature within each zone 44 by selectively channeling a flow of cryogenic fluid 50 to each zone 44 independently. Each spray nozzle assembly 54 includes a spray bar 60, a plurality of nozzles 62 coupled to the spray bar 60 for discharging the cryogenic fluid 50 from the spray bar 60, and a fan 64 positioned adjacent to the spray bar 60 to facilitate a mixing of the cryogenic fluid 50 being discharged from the nozzles 62 within the interior volume 12. The nozzles 62 are preferably arranged in a fan-like array to spray the cryogenic fluid 50 in all horizontal directions. The spray nozzle assemblies 54 are positioned throughout the interior volume 12 to facilitate cooling the interior volume 12.

In the illustrated embodiment, the cryogenic fluid supply tank 52 is mounted to an outer surface of the cargo trailer 14 to facilitate access to the fluid supply tank 52 to enable an operator to fill and re-fill the fluid supply tank 52 with cryogenic fluid 50. In one embodiment, the fluid supply tank 52 may also include a discharge control valve (not shown) that is coupled to the fluid supply tank 52 to enable the cooling fluid to be discharged from the fluid supply tank 52 during tank maintenance and/or to facilitate reducing an internal tank pressure. In another embodiment, the fluid supply tank 52 may be positioned within the cargo trailer walls 26-34.

In the illustrated embodiment, the ventilation assembly 18 is configured to discharge a cryogenic gas 50 from the interior volume 12, and includes a fan assembly 66 and at least one opening 68 extending through the cargo trailer 14 to couple the interior volume 12 in fluid communication with the ambient air 38 through the opening 68. A hatch assembly 70 extends over the opening 68 and is configured to selectively channel air and/or cryogenic fluid 50 through the opening 68. The fan assembly 66 is configured to channel a flow of air into the interior volume 12 and through the opening 68 to purge the cryogenic fluid 50 from the interior volume 12 to the exterior of the cargo trailer 14. In one embodiment, the fan assembly 66 is coupled to an exterior of the cargo trailer 14. Alternatively, the fan assembly 66 may be located at any position within the cargo trailer 14 to enable the ventilation system 18 to function as described herein. In one embodiment, a louver system (not shown) may be coupled to the fan assembly 66 to selectively channel ambient air 38 though the fan assembly 66 and into the interior volume 12. In the illustrated embodiment, the ventilation assembly 18 is configured to channel a flow of ambient air 38 from the cargo trailer exterior through the interior volume 12 to move the cooling fluid 50 through the opening 68 during a purge operation to purge gaseous cryogenic fluid 50 from the interior volume 12 by in-flow of ambient air to create a breathable atmosphere within in the interior volume 12. In another embodiment, the ventilation system 18 is configured to discharge the cryogenic fluid 50 from the interior volume 12 through the cargo access door 40. In one embodiment, the ventilation assembly 18 may also include an air supply tank (not shown) and/or an oxygen tank (not shown) that is coupled in fluid communication with the fan assembly 66 for channeling a flow of air and/or oxygen into the interior volume 12 to increase oxygen levels within the interior volume 12. In addition, the ventilation assembly 18 may also include an evaporator assembly 72 that is coupled to the fluid distribution assembly 16 for channeling a flow of ambient air 38 across a plurality conduits (not shown) that contain cryogenic fluid to facilitate cooling the ambient air 38 being channeled into the interior volume 12. In another embodiment, the ventilation assembly 18 may also include a vacuum system (not shown) for removing the cryogenic fluid 50 from the interior volume 12.

The cargo access assembly 20 is coupled to the cargo trailer 14 to facilitate access into the interior volume 12. In the illustrated embodiment, the cargo access assembly 20 includes a latch assembly 74 mounted to the cargo sidewall 34 and a safety locking member 76 that is removably coupled to the latch assembly 74 to facilitate preventing an operator from entering the interior volume 12. The latch assembly 74 includes an electro-mechanical latch that is operable between a locked position and an unlocked position. In the locked position, the safety locking member 76 is coupled to the latch assembly 74 to prevent an operator from removing the safety locking member 76 from the latch assembly 74. In the unlocked position, the safety locking member 76 is decoupled from the latch assembly 74 to enable the operator to remove the safety locking member 76 from the latch assembly 74 to access the interior volume 12. In the illustrated embodiment, the safety locking member 76 may include a cable assembly 77 that extends between the sidewalls 34. In one embodiment, the safety locking member 76 may include the cargo access door 40 to selectively lock and unlock the access door 40 to provide access to the interior volume 12. In another embodiment, the safety locking member 76 may include a gate, a door, an arm, a belt, and/or any suitable device that may prevent access into the interior volume 12. In addition, the cargo access assembly 20 may include a plurality of barriers (not shown) positioned with the interior volume 12 and defining each of the plurality of compartments 48 within the interior volume 12. Each barrier may include a door and a latch assembly 74 coupled to the door to selectively provide access into the corresponding compartment 48.

In the illustrated embodiment, the monitoring system 22 includes a plurality of sensors 78, a controller 80 that is coupled in communication with each of the plurality of sensors 78, and a display device 82 that is coupled to the controller 80 for displaying information to the operator. Each sensor 78 detects various parameters relative to the operation of the fluid distribution assembly 16, the ventilation assembly 18, the cargo access assembly 20, and the environmental condition of the cargo trailer 14 and transmits a signal indicative of the sensed parameter to the controller 80. Sensors 78 may include, but are not limited to only including, position sensors, vibration sensors, acceleration sensors, temperature sensors, pressure sensors, flow sensors, motion sensors, and/or any other sensors that sense various parameters relative to the operation of the system 10 and the environmental condition of the cargo trailer 14. As used herein, the term "parameters" refers to physical properties whose values can be used to define the operational mode, orientation, position, and operating conditions of the fluid distribution assembly 16, the ventilation assembly 18, the cargo access assembly 20, and/or the cargo trailer 14, such as, but not limited to, an operating mode, an interior volume temperature, an exterior temperature, an interior volume pressure, a barometric pressure, a supply tank pressure, oxygen levels, nitrogen levels, a cooling fluid temperature, a fluid supply pressure, a control valve operation, vibrations and accelerations at defined locations.

In the illustrated embodiment, the monitoring system 22 includes one or more temperature sensors 84, gas sensors 86, position sensors 88, proximity sensors 90, pressure sensors 92, and/or flow sensors 94. The temperature sensors 84 are configured to sense an ambient temperature within the interior volume 12 and/or a temperature of the cargo 42. The gas sensors 86 are configured to sense a presence and/or an amount of gas present within the interior volume 12. The sensed gases may include, but are not limited to including, oxygen, nitrogen, carbon dioxide and/or any suitable gas that enables the monitoring system 22 to function as described herein. The position sensor 88 senses a position of the fluid control valve 58, a position of the cargo access door 40, and/or a position of the latch assembly 74. The proximity sensors 90 sense a motion within the interior volume 12. The pressure sensors 92 sense a pressure within the interior volume 12, an external air pressure, a fluid pressure within the fluid distribution assembly 16, and/or a fluid pressure within the fluid supply tank 52. The flow sensor 94 senses a flow of cooling fluid being channeled through the fluid distribution assembly 16.

In the illustrated embodiment, the controller 80 includes a processor 96 and a memory device 98. The processor 96 executes various programs, and thereby controls other components of the system 10 according to user instructions and data received from the display device 82. The memory device 98 stores programs and information used by the processor 96. The processor 96 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory device 98 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor 96 to store, retrieve, and/or execute instructions and/or data.

The memory device 98 may also include a database 100 that contains information on a variety of matters, such as, for example, environmental parameters, predefined environmental conditions, temperatures, pressures, predefined operating conditions, and/or audio and visual image data for producing visual and/or audible notifications and/or alarms on displayed on the display device 82.

In the exemplary embodiment, the controller 80 includes a control interface module 102 that is coupled to the fluid distribution assembly 16, the ventilation assembly 18, and the cargo access assembly 20 for controlling an operation of the control valves 58, fan 64, fan assembly 66, and latch assembly 74. In addition, the controller 80 also includes a sensor interface module 104 that is coupled to each sensor 78 such as, for example, sensors 84-94 for receiving and transmitting data to and from each sensor 78. Each sensor 78 may transmit a signal continuously, periodically, or only once and/or any other signal timing that enables monitoring system 22 to function as described herein. Moreover, each sensor 78 may transmit a signal either in an analog form or in a digital form.

The display device 82 is coupled to the controller 80 for displaying information to a user and to receive user selection input indicative of the user's selection and transmit the user selection input to the controller 80 to enable the user to interact with the system 10. The display device 82 includes a display 106 and a user input device 108. The display 106 may be positioned within the interior of the cargo trailer 14, the exterior of the cargo trailer 14, within a vehicle (not shown) and/or any suitable location that enables a user to view information being displayed on the display 106. The display 106 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the user input device 108 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into the controller 80 and/or to retrieve data from the controller 80. Alternatively, a single component, such as a touch screen, a capacitive touch screen, and/or a touchless screen, may function as both the display 106 and as the user input device 108.

Various connections are available between the controller 80, the display device 82, the sensors 78, the control valves 58, the fan 64, the fan assembly 66, and the latch assembly 74. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside the system 10) network connection, whether wired or wireless.

During operation of the system 10, the liquid supply tank 52 is filled with liquid nitrogen at, for example, about −196° C. Prior to loading the interior volume 12 with cargo such as, for example, food, the monitoring system 22 may pre-cool the interior volume 12 by operating one or more control valves 58 to channel the cryogenic fluid 50, e.g. liquid nitrogen, to the spray nozzles 62 to spray the liquid nitrogen within the interior volume 12. As the liquid nitrogen is discharged into the interior volume 12, the liquid nitrogen evaporates and pre-cools the interior volume 12, the cargo trailer inner surface 36 and all internal elements, to a desired temperature. This may be done while the truck is in transit to, or awaits loading at, a loading site. The monitoring system 22 positions the control valves 58 completely or partially closed when the desired interior temperature is reached. During this operation, an atmosphere of almost pure gaseous nitrogen is created inside the interior volume 12, which may create a potentially hazardous area to an operator. Accordingly, the interior volume 12 must be purged with air prior to the loading operation. The monitoring system 22 performs the purging operation by operating the ventilation assembly 18 to open the hatch assembly 70 and operate the fan assembly 66 to channel air through the interior volume 12 and discharge the gaseous nitrogen from the cargo trailer 14. During this operation, the temperature of the interior volume 12 may be monitored to enable the monitoring system 22 to selectively channel air through the evaporator assembly 72 to facilitate controlling the temperature of air entering the interior volume 12. Alternatively, the ambient air is not cooled and the temperature of the interior volume 12 is monitored to assure that it stays within a proper temperature range.

Once the refrigeration space has been filled with air and a suitable atmosphere has been created, a food-loading operation is performed. During this operation, the monitoring system 22 operates the cargo access assembly 20 to enable an operator to enter the interior volume 12 to load the cargo 42. During the loading operation, the environmental condition of the interior volume 12 is monitored and monitoring system 22 operates the fluid distribution assembly 16 as necessary to maintain the desired interior temperature.

Once the food has been loaded, the door 40 is closed, and the truck is transported to its first destination. During transport, the monitoring system 22 monitors the interior volume 12 and operates the fluid distribution assembly 16 to adjust the internal temperature within the interior volume 12. When the cargo trailer 14 reaches a destination, it is necessary to purge gaseous nitrogen from the interior volume 12 and the purging operation is repeated.

The above operations are repeated, to enable the cargo trailer 14 to travel to numerous unloading sites, while ensuring that the cargo 42 is maintained at an appropriate temperature.

Figure 7:
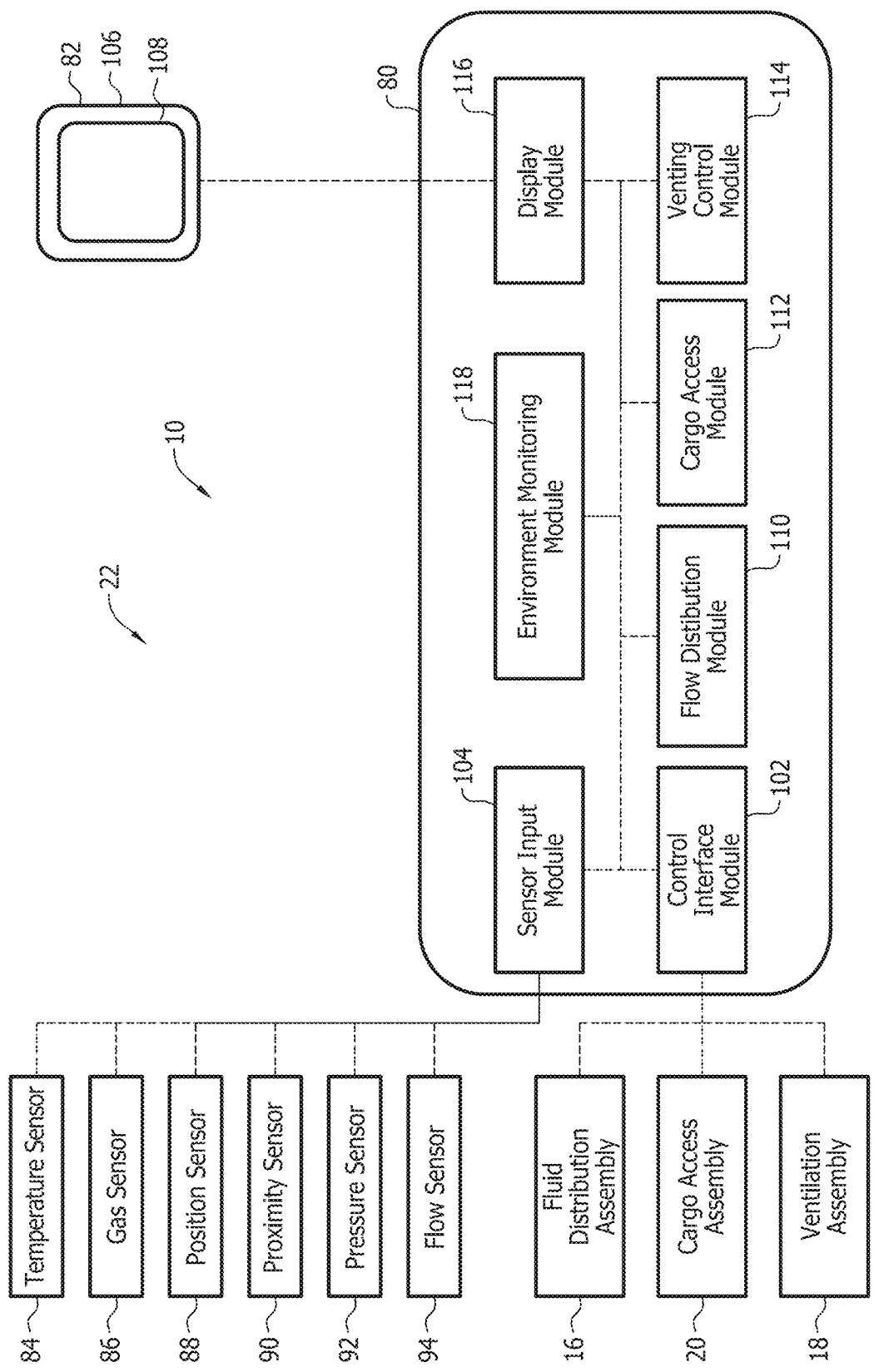
FIG. 7 is schematic view of a monitoring system that may be used with the system shown in FIG. 1, according to an embodiment of the present invention.

FIG. 7 is schematic view of the controller 80, according to an embodiment of the present invention. In the illustrated embodiment, the controller 80 includes a flow distribution module 110, a cargo access module 112, a venting control module 114, a display module 116, and an environmental monitoring module 118. The flow distribution module 110 receives data from the sensors 78 indicative of a flow of cryogenic fluid 50 through the fluid distribution assembly 16 and monitors a condition of the fluid distribution assembly 16 as a function of the sensed flow. The flow distribution module 110 also operates the fluid distribution assembly 16 as a function of data received from the environmental monitoring module 118 and input from the user. The cargo access module 112 operates the cargo access assembly 20 as a function of user input and data received from the environmental monitoring module 118. The venting control module 114 operates the ventilation assembly 18 as a function of user input and data received from the environmental monitoring module 118.

The display module 116 is coupled to the display device 82 to receive from and display information to the operator via the display device 82. The display module 116 also receives signals indicative of a user's selection and transmits the data to the flow distribution module 110, the cargo access module, the venting control module 114, and the environmental monitoring module 118. The display module 116 also generates audible and visible alarms to provide a notification to the user of an environmental condition of the cargo trailer 14.

The environmental monitoring module 118 receives data indicative of environmental parameters from the sensors 78 and determines an environmental condition of the cargo trailer 14 as a function of the received environmental parameters. In addition, the environmental monitoring module 118 also receives data indicative of the operation of the fluid distribution assembly 16, the ventilation assembly 18, and the cargo access assembly 20, and transmits data to the flow distribution module 110, a cargo access module 112, and a venting control module 114 to control an operation of the fluid distribution assembly 16, the ventilation assembly 18, and the cargo access assembly 20, respectively.

In the illustrated embodiment, during operation of the system 10, the controller 80 is configured to receive a monitoring signal indicative of the sensed environmental parameter from at least one sensor 78 and determine an environmental condition of the cargo trailer 14 as a function of the environmental parameter. The controller 80 is also configured to provide a notification signal via the display device 82 if the determined environmental condition is different than a predefined environmental condition. For example, in one embodiment, the controller 80 may receive a request from the operator to access the interior volume 12, responsively determine an environmental condition of the interior volume 12, and provide a notification to the operator indicative of the determined environmental condition. By providing a notification to the operator of the environmental condition of the interior volume 12, the system 10 may notify the operator of any potentially hazardous areas within the interior volume 12 before the operator enters the area.

In one embodiment, the controller 80 receives a signal from an oxygen sensor 86 that is indicative of a level of oxygen within the interior volume 12. The controller 80 may determine the environmental condition as a function of the sensed oxygen level.

In addition, in the illustrated embodiment, the controller 80 is configured to receive a request to adjust a temperature within the cargo interior volume 12 and operate the fluid distribution assembly 16 to adjust the interior volume temperature if the determined environmental condition is equal to the predefined environmental condition. For example, the environmental monitoring module 118 may receive a request from the flow distribution module 110 to operate the fluid distribution assembly 16 to lower a temperature within the interior volume 12. The environmental monitoring module 118 determines an environmental condition based on the sensed environmental parameters and operates the fluid distribution assembly 16 based on the determined environmental condition. In one embodiment, the controller 80 may receive a request to operate the fluid distribution assembly 16, responsively senses a movement within the interior volume 12 to determine a presence of an operator/user within the interior volume 12 as a function of the sensed movement, and operates the fluid distribution assembly 16 upon determining the operator is not within the interior volume 12. In addition, the controller 80 may also determine an operating condition of the cargo access assembly 20, and operate the fluid distribution assembly 16 if the determined operating function is equal to a predefined operating function. For example, the controller 80 may determine if the cargo access assembly 20 is in the locked position to prevent access to the interior volume 12 and operate the fluid distribution assembly 16 only if the cargo access assembly 20 is locked.

In another embodiment, the controller 80 may receive a request from an operator to operate the cargo access assembly 20 to provide access to the interior volume 12. The controller 80 may determine whether the sensed interior volume environmental condition is equal to the predefined condition and operate the cargo access assembly 20 to enable an operator to enter the interior volume 12 if the determined environmental condition is equal to the predefined environmental condition. For example, the controller 80 may determine if sensed oxygen levels are within predefined oxygen levels before operating the cargo access assembly 20 to ensure the interior volume 12 includes sufficient amounts of breathable air. In addition, the controller 80 may determine if the ambient temperature within the interior volume 12 is above a predefined temperature before operating the cargo access assembly 20 to ensure the interior volume is at a temperature that is safe for entry. In addition, the controller 80 may provide a notification of the oxygen levels and/or ambient temperature of the interior volume 12 to the operator before operating the cargo access assembly 20. In addition, the controller 80 may continuously monitor the interior volume 12 with the cargo access assembly 20 in the unlocked position and provide notification to the operator of a change in one or more environmental parameters such as a change in temperature and/or a change in oxygen levels.

In one embodiment, the controller 80 may also operate the ventilation assembly 18 as a function of the determined environmental condition. For example, the controller 80 may receive an operator request to access the interior volume 12 and responsively operate the ventilation assembly 18 upon receiving the request. In addition, the controller 80 may operate the ventilation assembly 18 upon sensing the cargo access door 40 and/or the cargo access assembly being unlocked.

In the illustrated embodiment, the controller 80 is configured to monitor on operation of the fluid distribution assembly 16. Moreover, the controller 80 is configured to receive, from one or more sensor 78, a monitoring signal indicative of an operating parameter of the fluid distribution assembly 16 and determine an operating condition of the fluid distribution assembly 16 as a function of the sensed operating parameter. In one embodiment, the controller may also provide a notification signal if the determined operating condition is different than a predefined operating condition. For example, the controller 80 may receive a signal indicative of a temperature of the cryogenic fluid being discharged from at least one spray nozzle assembly 54 and provide a notification if the sensed temperature is different than a predefine temperature. In addition, the controller 80 may receive a signal indicative of a sensed temperature of the fluid conduit 56, a sensed differential pressure across at least one control valve 58, and/or a sensed fluid pressure within the fluid distribution assembly 16 and provide a notification to the operator if the sensed parameters are different than predefined operating parameters.

In the illustrated embodiment, the controller 80 may also receive a signal indicative of an ambient temperate within the interior volume 12, and operate the fluid distribution assembly 16 to selectively channel the cryogenic fluid 50 into the interior volume 12 as a function of the sensed temperature. In one embodiment, the controller 80 determines a flow rate of the cryogenic fluid 50 being channeled into the interior volume 12 as a function of a predefined rate of cooling and the sensed interior temperature, and channels a flow of cryogenic fluid 50 into the interior volume 12 at the determined flow rate. The controller 80 also determines an actual rate of cooling as a function of the sensed interior temperature monitored over a predefined period of time, and adjusts the flow rate of cryogenic fluid 50 being channeled into the interior volume 12 to reduce a difference between the actual rate of cooling and the predefined rate of cooling. In one embodiment, the controller 80 determines a flow rate of cryogenic fluid 50 as a function of a sensed interior temperature, an exterior trailer temperature, and/or an insulation value of the cargo trailer 14.

In the illustrated embodiment, the controller 80 is also configured to determine an environmental condition associated with each of the plurality of zones 44 defined within the interior volume 12 and provide a notification signal indicative of the determined environmental condition of each one of the zones 44. The controller 80 is also configured to sense a temperature within each of the zones 44 and operate the fluid distribution assembly 16 to selectively channel a flow of cryogenic fluid 50 to each one of the zones 44 to adjust a temperature of the zones 44 independently.

Figure 8:
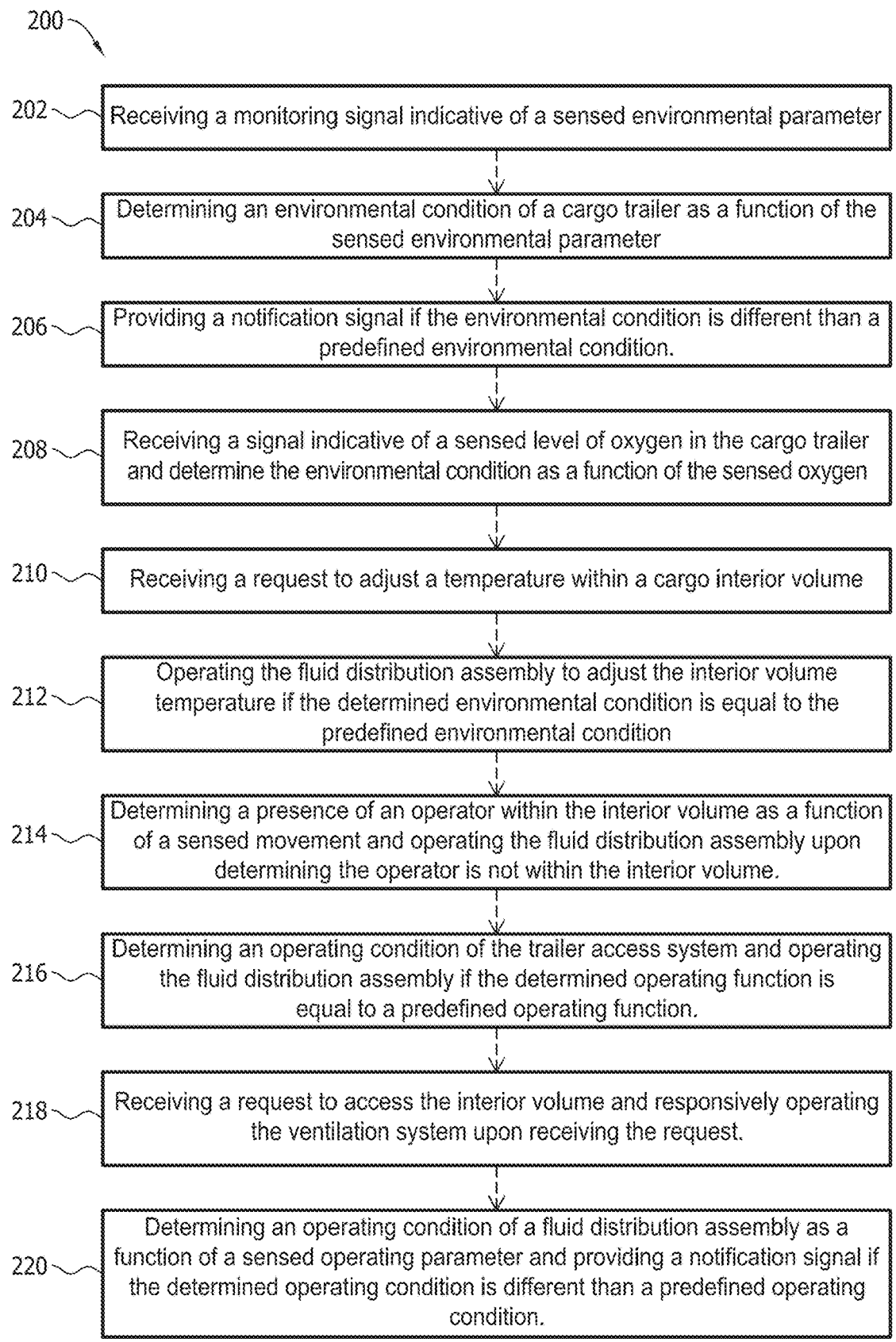
FIG. 8 is a flowchart of a method that may be used with the system shown in FIG. 1 for controlling a temperature within an interior volume of a cargo trailer, according to an embodiment of the invention.

FIG. 8 is a flowchart of a method 200 that may be used with the system 10 for controlling a temperature within the interior volume 12 of the cargo trailer 14, according to an embodiment of the invention. Each method step may be performed independently of, or in combination with, other method steps. Portions of the method 200 may be performed by any one of, or any combination of, the components of the system 10. In the illustrated embodiment, the method 200 includes the steps of receiving 202 a monitoring signal indicative of a sensed environmental parameter, determining 204, by the system 10, an environmental condition of the cargo trailer as a function of the sensed environmental parameter, and providing 206 a notification signal to an operator if the determined environmental condition is different than a predefined environmental condition. The system 10 may also determine an environmental condition associated with each one of a plurality of monitoring zones defined within the interior volume and provide a notification signal to the operator indicative of the determined environmental condition of each one of the monitoring zones.

In the illustrated embodiment, the method 200 also includes the step of receiving 208 a signal indicative of a sensed level of oxygen within the interior volume and determining the environmental condition as a function of the sensed oxygen level. In addition, the method includes the steps of receiving 210 a request to adjust a temperature within the cargo interior volume and operating 212 the fluid distribution assembly to adjust the interior volume temperature if the determined environmental condition is equal to the predefined environmental condition.

The method 200 also includes the step of determining 214 a presence of an operator within the interior volume as a function of the sensed movement and operating the fluid distribution assembly upon determining the operator is not within the interior volume. In addition, the method 200 may include the step of determining 216 an operating condition of the cargo access assembly and operating the fluid distribution assembly if the determined operating function is equal to a predefined operating function. The method 200 may also include the steps of receiving 218 a request to access the interior volume and responsively operating the cargo access assembly to enable an operator to enter the interior volume if the determined environmental condition is equal to the predefined environmental condition. The system 10 may also receive a request to access the interior volume and responsively operating the ventilation assembly upon receiving the request.

The method 200 may also include the steps of determining 220 an operating condition of the fluid distribution assembly as a function of the operating parameter and providing a notification signal if the determined operating condition is different than a predefined operating condition. In addition, the system 10 may also receive a signal indicative of an ambient temperate within the interior volume and operate the fluid distribution assembly to selectively channel cryogenic fluid into the interior volume as a function of the sensed temperature. The system 10 may also determine a flow rate of cryogenic fluid being channeled into the interior volume as a function of a predefined rate of cooling and a sensed interior temperature; channel a flow of cryogenic fluid into the interior volume at the determined flow rate; determine an actual rate of cooling as a function of the sensed interior temperature monitored over a predefined period of time, and adjust the flow rate of cryogenic fluid being channeled into the interior volume to reduce a difference between the actual rate of cooling and the predefined rate of cooling. The system 10 may also determine a flow rate of cryogenic fluid as a function of one of the sensed interior temperature, an exterior trailer temperature, an insulation value of the cargo trailer.

Referring again to FIGS. 1-7, in one embodiment, the system 10 may include a semi trailer cargo temperature control unit that includes a means by which to dispense liquid nitrogen ($LN_2$) into the cargo hold of a semi trailer for the purpose of cooling cargo, an electronic control system by which to modulate the flow rate of $LN_2$ to maintain the temperature at a user-defined setpoint, a safety system to measure one or more environmental conditions in the cargo hold and provide audible and/or visible warning to the operator, a safety system to measure one or more environmental conditions in the cargo hold and guard the operator from potentially hazardous conditions, a method for ventilating fresh air into the cargo hold, using an air supply from one or more cargo door(s) and ducting to direct the airflow, a human/machine interface (HMI) to provide the operator with a means to issue system commands and receive information on the system behavior, and a self-contained electrical energy storage system to allow operation of the cooling system when not connected to a tractor or a stationary power source. The system 10 may also include a cargo temperature control unit comprising the elements described adapted for use on a "straight truck".

The system 10 may also include a system which incorporates one or more methods by which to divide the cargo hold into two or more zones, each zone with the ability to maintain its temperature independently of adjacent zones, and which incorporates individual controls and setpoints for each sprayer outlet.

The system 10 may also include a safety system that includes at least two independent oxygen measurement devices, with a means by which to compare the output of each device to one another for the purpose of providing diagnostic checks, a means to communicate the oxygen level of the cargo to the user, a microprocessor-based control subsystem for the warning function, a discrete electronic control subsystem for the guarding function, in which no software is utilized, a means by which to compare the calculated state of the warn subsystem and guard subsystem, and to prevent operator entry if the states do not agree, a discrete electromechanical or electronic interlock between the emergency stop ("E-stop") button and cryogenic valves that causes the valve power to be interrupted upon emergency stop activation, an emergency stop button mechanism that provides an electrical command to various system elements via a discrete signal and/or a serial communication bus, a discrete electromechanical or electronic interlock between the guarding mechanism and cryogenic valves that causes the valve power to be interrupted whenever the guard mechanism is not locked into place, and a guarding mechanism that provides an electrical command to various system elements via a discrete signal and/or a serial communication bus.

In one embodiment, the system 10 may include a safety system for a cryogenic cargo cooling unit as described above that utilizes three or more oxygen measurement devices and a majority voting technique in order to provide continuous operation with the failure of one or more sensors, and a safety system for a cryogenic cargo cooling unit as described above that utilizes redundant and independent means of communicating information about oxygen levels to the warning and guarding subsystems. In addition, the system 10 may include a safety system for a cryogenic cargo cooling unit as described above where the redundant and independent means includes a serial communication bus and a hardwired discrete signal line, and a safety system for a cryogenic cargo cooling unit as described above that provides one or more of the following means by which to detect a cryogenic valve that is malfunctioning in a manner that allows $LN_2$ to enter the cargo hold, and provides the appropriate warning to the operator.

In another embodiment, the system 10 may include a means by which to measure temperature in the cryogenic line downstream of the valve, a means by which to measure differential pressure across the valve, and a means by which to measure the discharge temperature of the sprayer nozzle in the cargo hold.

The system 10 may also include a safety system that utilizes an alternative discharge opening outside the cargo area and a valve to control the opening for the purpose of safety discharging nitrogen outside the cargo area in event of a malfunctioning cryogenic valve.

In addition, the system 10 may also include the use of one or more means by which to detect that a person is occupying the cargo hold, and to inhibit the injection of $LN_2$ while the cargo hold is inhabited including the use of passive infrared sensing with one or more zones of detection, the use of active infrared sensing, the use of automated optical detection using wavelengths in the visible or infrared range, and the use of radio frequency detection and ranging techniques.

The system 10 may also include a safety system for a cryogenic cargo cooling unit that provides a means by which to alert users at the entry to the trailer of a safety-related fault or error, visual warning beacon along the inside perimeter of the trailer door frame, and audible warning siren mounted to the outside entry of the trailer in such a manner as to be audible from inside a typical shipping facility (or "dock"). The system 10 may also include a safety system for a cryogenic cargo cooling unit that requires a particular sequences of events prior to releasing nitrogen into the cargo hold, including the manipulation of more than one switch in the interior or exterior of the cargo hold in such a manner that requires the operator to inspect the cargo hold for the presence of other occupants. This may also include a requirement that the manipulation events occur within a specified period of time.

In one embodiment, the system 10 may also include a cryogenic cooling system for the transportation of refrigerated or frozen goods that utilizes a combination of feed-forward and feedback control techniques to regulate the cargo temperature, a controller that utilizes infrared sensors or cameras to determine the temperature of the cargo hold and its contents for the purpose of providing a feedback signal, a controller that utilizes an estimation of the liquid nitrogen flow rate to estimate the current rate of cooling, including the use of measuring the pressure differential between the vessel and cargo hold, a controller that utilizes temperature information from the interior and exterior of the cargo hold, as well as an estimate of the cargo hold insulation value, to estimate the current rate of heating, a controller that utilizes estimates of the rate of heating to form a feed-forward command to the cooling system, and a controller that utilizes temperature feedback to modify its estimate of cargo hold insulation value.

The system 10 may also include a cargo temperature control system that utilizes temperature measurement located within or near cargo hold vents (example: floor drains) to obtain information about the condition (temperature) of the gases exiting the trailer for the purpose of optimizing energy consumption. In addition, the system 10 may also include a means by which the physical location of zone-specific modules in a multi-zone system can be automatically determined by the cooling system, a hardware solution using discrete connections in the wiring harness to provide a location-specific configuration of multiple connector pins, and a software solution using system stimulus and module behavior to determine the location of one or more modules.

In one embodiment, the system 10 may also include a cryogenic cargo temperature control system that utilizes multiple serial communication buses, including at least one which is dedicated to communication only among the cooling system control modules ("private"), and at least one which is dedicated to communication between the cooling system and external accessories such as data acquisition and telematics equipment ("public"). In addition, the system 10 may also include an oxygen measurement system as described above that utilizes integrated measurement of barometric pressure or the estimation of barometric pressure via means such as global positioning system (GPS) to provide partial-pressure compensation for varying atmospheric conditions. In addition, the system 10 may also include an oxygen measurement system as described above that utilized the cargo temperature measurement technique to provide partial-pressure compensation for varying atmospheric conditions.

In one embodiment, the system 10 may also include a liquid nitrogen distribution system as described above that utilized an integrated valve body or manifold to route liquid nitrogen from the cryogenic vessel head through the flow control valves to one or more independent zones(s), and an integrated valve body that additionally integrates one or more measurement means to detect a malfunctioning cryogenic valve. In addition, the system 10 may also include a safety system that utilizes one or more methods of measuring cargo hold air pressure (including the use of the barometric pressure sensors) to provide a warning to the operator that the cargo hold has become pressurized above atmospheric levels, a liquid level measurement system that utilizes a device to measure the inclination of the vessel, and also the differential pressure of the vessel to determine the appropriate "level" measurement of the vessel, and a liquid level measurement system that utilizes a multi-axis accelerometer as the device to measure the inclination of the vessel.

In another embodiment, the system 10 may also include a cargo hold constructed with one or more remote-operated valves that can be opened when the system is not operating for the purposes of cleaning and servicing the trailer, but are closed during normal cooling modes to improve the insulation performance of the cargo hold, and a means by which to allow ambient air into the trailer if the ambient air temperature is below the temperature inside the cargo hold, and a means by which to close this entry upon the cargo hold temperature reaching that of the ambient air temperature.

In addition, the system 10 may also include a means to create a multi zone trailer utilizing a multitude of safety locking devices (guard sections) installed along the length of the trailer at an interval that matches the length of a standard pallet for the purpose of allowing an operator to install a removable bulkhead in a multitude of locations according to the cargo composition, and a system utilizing a means of zoning described in claim 27 wherein the temperature control system utilizes information about the removable bulkhead position to establish appropriate cooling tuning parameters according to the enclosed volume of the cargo hold zone. In one embodiment, the system 10 may also include a means to create a multi zone trailer utilizing a multitude of discrete plug in locations for a singular safety guarding device to allow the operator to install a removable bulkhead in a multitude of locations and a means to implement a removable bulkhead where one side is mechanically latched into the side wall, and the opposite side is held in place via an electromechanical safety locking device.

In one embodiment, the system 10 may also include a method to evacuate the air in the cargo area using a flexible closure device held in place with magnetic strips and which automatically opens and closes according to circulation fan operation. In addition, the system 10 may also include a filling station that utilizes information about the vehicle position and a means of communication with the cooling system to automatically put the system in fill mode when pulled up to the filling station, where the means of vehicle position is provided via global positioning system (GPS) and the means of communication is a wireless format such as Bluetooth or WiFi, a cooling system that utilizing information about the vehicle position to automatically engage in the ventilation process when a vehicle reaches its destination, and a cooling system that utilizes a global positioning system (GPS) to form a virtual "geo-fence" in order to determine the location of a destination and to automatically initiate ventilation of the cargo hold.

In another embodiment, the system 10 may also include a cryogenic cooling system that uses a means to detect the rotation and/or rapid deceleration of the vehicle to detect a potentially hazardous collision or rollover event for the purpose of automatically operating the vent valve in order to reduce the stored mechanical energy in the storage vessel and a cryogenic cooling system that utilizes a collision detection function that utilizes any combination of multi-axis accelerometers and gyroscopic yaw sensors to detect a collision or rollover event. In addition, the system 10 may also include a means by which to power an electromechanical latching mechanism on a removable bulkhead by applying a voltage potential between the load securing mechanisms ("E tracks") on opposite sides of the trailer and a means by which to power an electromechanical latching mechanism on a removable bulkhead by locating an electrochemical storage battery in the bulkhead.

In another embodiment, the system 10 may also include a device to protect the rollup door and warn the operator of conditions within the trailer, ODP barrier light tower, a guarding mechanism that can be stored in a closeable "locker" built into the side wall to keep it out of the way of the load unload process, and a mounting method for a door switch to protect it and allow visibility.

Purpose and Functionality

The system 10 described herein may include a direct $LN_2$ cryogenic cooling system (CCS) for insulated cargo trailers. This includes the electronic and mechanical elements required to maintain operator safety and control the temperature of the cargo. Additional elements will be provided to interface with the user for the purpose of communicating information about the operation of the cooling system, setting the operational mode, and allowing system maintenance.

It is acknowledged that the inherent design, operation, and maintenance of a system that utilizes the direct injection technique also may expose operators to a variety of hazards. Safety countermeasures will be developed to reduce the risk of operator hazard to an acceptably low level.

System Interfaces: the following is a list of interfaces between the item and its surrounding environment.

Trailer body/chassis—the system will be installed into a trailer that is constructed by the vehicle manufacturer. This includes the trailer roof, sidewalls, floor, and frame. The trailer cargo compartment provides an insulated environment for the cargo, as well as paths for running cables and piping. Various system elements rely on the trailer body and chassis to provide mechanical mounting locations.

Tractor umbilical(s)—the item will be connected to the tractor via a standard 7-way connection, and additionally may utilize dedicated power and data connections. Via the connections to the tractor, the trailer will receive +12V power, ground, and the brake signal, as well as any other signals that may be required for ancillary functions (such as telematics and data acquisition). The +12V power supply will allow charging of the system batteries when the trailer is connected to a tractor. The brake signal may be utilized to reduce current draw from the +12V supply during braking events, as the trailer antilock braking system (ABS) may need to draw significant current from this line.

Solar panel—the item may draw power from a solar panel mounted on the trailer roof. The purpose of this supply is to maintain battery charge level when the trailer is not connected to a tractor or to shore power.

Shore power—the item may draw power from an 110V/220V supply when plugged into a stationary source of "shore power". This will allow charging of the system batteries.

Batteries—the item will draw upon one or more chemical storage batteries, located on the trailer body or chassis. The nominal voltage of this supply is 12V. The system is presently intended to make use of lead-acid battery chemistry, although other battery technology may be employed in future versions as advanced technology becomes more economical.

Filling port—the item will be connected to a filling port that allows an operator to refill the LN2 vessel.

Thermal interface—the vessel will receive heat from its environment for the purpose of building internal pressure via the phase change of stored nitrogen from liquid to vapor. This pressure will drive the LN2 through the valves, plumbing, and sprayer bars. The trailer body will also receive thermal energy from the environment, with the potential effect of changing the thermal load presented to the TRU.

Vessel venting—The vessel will vent excess N2 vapor to its surrounding environment in order to maintain a safe system pressure.

$LN_2$ distribution—The item will dispense nitrogen (as a liquid, vapor, or mixed-phase flow) into the cargo hold.

Information—the system provides information to operators via visual and audible means.

Elements of the Item $LN_2$ storage vessel. This is a double-wall vacuum-insulated container that is constructed of stainless-steel components. The vessel contains means by which to build and regulate its internal pressure. The LN2 vessel will also contain a means by which to measure fuel level.

Valve assembly. Co-located with the vessel is a system of valves that regulate the flow of LN2 from the vessel for the purpose of cooling, venting, and fueling. Electromechanical valves are utilized for functions under direct command of the item's electronic control system, while manual valves may be utilized for the purpose of maintenance, repair, and emergency response.

Sprayer assemblies. One or more sprayer assemblies ("spray bars") will be utilized to provide nitrogen to the cargo hold. These devices are constructed of aluminum extrusions or fabricated structure, and contain design features to quickly evaporate the liquid nitrogen into its gaseous form as it is sprayed into the cargo hold.

Plumbing. Metallic or composite pipes will be provided to facilitate the transfer of $LN_2$ from the vessel to the sprayer assembly. Typically routing of this plumbing would be along the trailer underbody, through the trailer walls, and within the trailer interior. The plumbing must be capable of withstanding the thermal loads provided by the $LN_2$ contained within, as well as being compatible with the trailer manufacturing process.

Ventilation fans. Located near the sprayer bars, the ventilation fans are tasked with circulating fresh air into the cargo compartment in order to return the oxygen concentration to a level that is safe for operators.

External Control Panel (ECP). This module presents an HMI to the operator via an electronic display (such as an LCD panel), and communicates user requests to the cooling system. An operator will be able to program the system operating mode, program setpoints related to the cooling parameters, and receive information about the system's operation. System diagnostic information will also be available for the purpose of troubleshooting and repair. A data interface (such as a USB connection) will be provided to allow for data retrieval and reprogramming of module software.

Oxygen Display Panel (ODP). This electronic control unit presents an interface to the user for the purpose of communicating information related to the oxygen level in the cargo hold. The ODP also contains the electronics and mechanisms for the gate locking device.

Power Control Unit (PCU). This electronic control unit is tasked with managing the various power supply sources to the system for the purpose of maintain proper battery state-of-charge (SOC), providing other electronic control units with power from the system batteries, controlling the electromechanical valves, CAN bus monitoring, and making operation decisions based upon sensor data and user commands.

Spray Nozzle Unit (SNU). This is an electronic control unit that obtains data from the temperature sensors, and actuates the fans during the ventilation cycle. This module is located near one of the spraybar assemblies.

Driver Light Panel (DLP). This module employs a series of LED indicator lamps that are placed as to be visible in the driver's rear-view mirrors. Information about the system operating status can be communicated using a combination of LED behaviors (color, blinking vs. solid illumination, various combinations of lamps illuminated, etc.).

O2M. This module acquires data from a set of oxygen sensors, performs compensation, filtering and diagnostics, and communicates the calculated value via the CAN bus and a discrete signal line to the ODP.

Oxygen sensors. Oxygen sensors will be utilized to measure the actual oxygen content of the air contained within the cargo hold. The sensor output may require compensation for ambient temperature and barometric pressure, and will typically require re-calibration at several points in the sensors' lifespan. These sensors require warm-up time at the beginning of each power cycle in order to stabilize at a controlled temperature.

Temperature sensors. Each zone will have temperature sensors to measure the temperature of the cargo hold. Additional sensors may be provided to measure the temperature near the sprayer bar outlet for verification of proper $LN_2$ flow. The external temperature may also be measured for purposes of establishing proper cooling function.

Barometric pressure sensor—in order to compensate the $O_2$ sensors for varying ambient pressure, as well as providing additional information on $LN_2$ flow rate, a barometric pressure sensor may be utilized.

CAN bus. Modules within the system will be connected via controller area network (CAN) in order to communicate data and commands.

Door sensor. The door sensor is used measure the status of the cargo door.

E-stop. The emergency stop—or E-stop—button is used to immediately halt $LN_2$ dispensing and active an external alarm if a human is present during the cooling cycle operation.

Safety lock solenoid. The safety lock solenoid is an electromechanical device that, when commanded by a module within the ODP, releases the safety locking member and allows entry to the cargo hold. It contains multiple sets of mechanical switch contacts to determine the status of the locking member.

Operation. The system is placed into cooling mode with an operator command via the ECP HMI. If a series of self-tests are passed, and the cargo door is closed and the gate locking device properly secured, the system will initiate cooling operation. Temperature setpoints as well as desired cooling ramp rates and pre-set profiles, can be commanded by the operator via the ECP. If the cooling function is inhibited due to any number of possible reasons, the ECP will attempt to communicate this information to the operator for the purpose of debugging or service.

The cooling function consists of dispersing LN2 into the cargo hold to maintain the programmed temperature set point. In this operational mode, the valve duty cycle will be varied in order to provide the volume of nitrogen required to provide sufficient energy to cool the cargo and compensate for heat loss through the trailer walls. Both feedback and feed-forward techniques may be employed to determine the valve duty cycle, and models of the trailer and cooling system performance may be utilized to further serve this purpose. In the case of multiple zones, the appropriate information will be used to independently control the temperature of each zone.

Upon opening the cargo door, dispensing of LN2 will cease, and the ventilation fans will circulate fresh air through the cargo door and into the cargo hold if the oxygen levels are below the minimum safe threshold. Until the cargo hold oxygen levels are determined to be above the minimum safe threshold, the ODP will indicate via audible and visual warnings that a potentially unsafe O2 level is present, and the gate lock will not release upon request. Ventilation will continue until sufficient air is exchanged with the environment. Once the O2 level returns to a safe state, the ventilation fans will cease operation, the ODP will indicate that a safe O2 level has been reached, and the gate lock will release upon operator command.

The cooling function can be re-initiated by once again securing the cable gate lock and closing the cargo door.

Oxygen levels may be monitored continuously during normal operation of the cooling system.

Refueling. The refueling functional mode facilitates operation of the CCS by replenishing the level of LN2. This mode can be accessed during the storage or cooling modes by activating a momentary switch near the LN2 refueling port, and connecting a fuel source (typically a custom-installed fueling station, although refueling from a mobile truck may be required during development or service).

During fueling, the operator will be tasked with making the physical connection between the fuel source and the CCS, monitoring the progress of the fueling process, disconnecting the station upon cessation of fueling, and recording metrics related to the CCS operation (typically related to the time of operation and the volume of fuel consumed).

Storage. In storage mode, the goal is to minimize the power consumption of a trailer that is not being used for some period of time (typically characterized as days or weeks of downtime). In this mode of operation, the trailer should be placed into a safe state, and all systems not required for maintaining a safe state shall be powered-down until the system is commanded into a different functional mode.

Maintenance/Service. Maintenance/service mode will be used to retrieve any current or stored diagnostic trouble codes (DTCs) and assess the performance of the system or elements of the system. It can be assumed that a maintenance technician may, at a minimum, need to access sensor data and manually activate loads such as the ventilations fans, warning devices, and valves.

Foreseeable misuse. The following situations should be considered in the design and deployment of the CCS:

Person seeking cool environment. Operators or bystanders often will utilize a refrigerated trailer for personal comfort, particularly in warmer climates. With existing diesel TRUs, this presents minimal hazard to the operator. In a cryogenic direct-injection system, a person utilizing the system in this fashion is likely to be exposed to an environment depleted of O2.

Overfilling. It is possible that an operator may seek to deliberately overfill the system in an attempt to gain more usable range.

Auxiliary Refrigeration. An operator may seek to use the CCS to supplement or relieve the HVAC system of the building to which the trailer is docked. An example of this scenario would be an attempt to use the trailer's cooling system in case of a power outage at a distribution center or grocery store. Such usage could result in creating an environment that is depleted of O2.

Summary of Safety Goals—the following list is a summary of safety goals which must be satisfied to avoid unacceptable risk of exposing a user of the system to one or more hazards. The operator must be protected against entering a cargo hold that is depleted of O2. The system must not allow the cargo hold to become depleted of O2 while an operator is present. The operator must be provided a means by which to inhibit the release of LN2. The system must not allow the rapid release of mechanical energy from the vessel during normal use. The system must not allow the rapid release of mechanical energy from the vessel during traffic accidents. The rapid release of mechanical energy from the cargo hold must be avoided during normal operation.

For the scenario in which an operator may enter a cargo hold that is depleted of O2, a CCS without any safety features would depend upon an operator's ability to determine whether the cargo hold is safe to enter. As the effects of O2 deficiency may incapacitate the operator, and may arise without warning, this is clearly not a workable solution for even highly-trained operators. Additional safety mechanisms are determined to be required to prevent an operator from entering a cargo hold that is depleted of O2.

For scenarios involving the discharge of LN2 into an occupied cargo hold that was previously at a safe O2 level, it may be reasonable to expect that the operator will notice the effects of O2 deficiency in the absence of other distractions. Given the typical working environment with a substantial amount of activity in and around the trailer, it is unreasonable to solely rely upon the user to avoid this hazard. Additional safety mechanisms are determined to be required to prevent the discharge of LN2 into an occupied cargo hold that was previously at a safe O2 level.

For scenarios involving the discharge of LN2 into an occupied cargo hold with a locked door, the operator may not be able to locate the door latch mechanism and correctly manipulate it within the fault tolerant time interval. The result would be that the operator may be exposed to an environment depleted of O2. Additional safety mechanisms are determined to be required to the discharge of LN2 into an occupied cargo hold with a locked door.

The scenario associated with the release of mechanical energy from the cargo hold during door opening may be addressed via non-E/E means. Ventilation of the cargo hold can prevent the accumulation of N2 and the subsequent rise in pressure. For trailers with outward-swing doors, labeling can be provided near the cargo hold door latch to warn an operator of this hazard and instruct the operator to stand clear of the door during unlatching. No additional safety mechanisms are determined to be required if the described non-E/E measures are implemented.

Potential Safety Mechanisms

O2 Monitoring. It is possible to monitor the O2 levels of the cargo hold during times where it is reasonable to expect that an operator may be present, or may wish to enter the hold. This technology is commercially-available at a reasonable cost. Information concerning the O2 levels can be transmitted via the serial bus or discrete signal paths. These techniques may use electrical or optical signals. The practice of monitoring O2 levels is not itself a complete safety mechanism, as there is also the need to provide information to an operator, or take action against a potentially unsafe operator activity.

Valve Monitoring. By monitoring the status of the cryogenic control valves, it is possible to determine if the environment is at risk of becoming unsafe to an occupant. Multiple monitoring techniques are potentially feasible, as described below. The direct monitoring of valve pintle position may be possible. This technique would allow the system to determine if a valve is being driven to an open position, or if the valve is being held open by a mechanical issue even when unpowered. Pintle position monitoring for cryogenic valves is not widely available. The direct monitoring of the valve electrical power supply is possible. This should allow an ECU to determine if power is inadvertently being applied to the valve and thus allowing an unintended discharge of LN2. It does not address mechanical issues that may cause LN2 discharge. Electrical monitoring of the valve electrical power supply is readily accomplished through typical ECU diagnostic techniques. The valves may also be monitored indirectly by the measurement of temperature or O2 levels. Temperature can be measured downstream of the valve (either in the distribution plumbing, or via a temperature probe placed near the spray bar discharge location). A significant drop in temperature when the system should not be actively cooling could indicate an unintentional discharge of LN2. Additionally, unintentional release of LN2 may be inferred by a drop in O2 levels when the system should not be actively cooling the cargo hold. Information concerning the valve operation can be transmitted via the serial bus or discrete signal paths. These techniques may use electrical or optical signals. The practice of monitoring O2 levels is not itself a complete safety mechanism, as there is also the need to provide information to an operator, or take action against a potentially unsafe operator activity.

Occupant Detection. It is possible to monitor the cargo hold for the presence of an operator. Technologies include passive detection systems that utilize signals in the visible-light or infrared spectrums, as well as active detection systems using ultrasonic or laser emitters and detectors. As the cargo is generally stationary and typically much colder than the human body, it should be possible to determine if an operator is present if that person is moving. Potential drawbacks include false triggering due to cargo movement, as well as the possibility of cargo obstructing the mechanism's ability to "see" an occupant. An E-stop switch may be considered to be a means of occupant detection. This would depend upon the operator's ability to perceive that unsafe conditions potentially exist. Detection of the cargo door can be considered to be a means of occupant detection during normal operation of the system, as the cargo hold can be assumed to be occupied if the door is open. Making the opposite assumption (that the cargo hold is unoccupied if the door is closed) would rely on operator inspection of the hold prior to closing the door. Information concerning the occupant status can be transmitted via the serial bus or discrete signal paths. These techniques may use electrical or optical signals. The practice of detecting an occupant is not itself a complete safety mechanism, as there is also the need to provide information to an operator, or take action against a potentially unsafe operator activity.

Warning of Unsafe O2. With some combination of O2 monitoring, valve monitoring, and occupant detection in place, sufficient information is available to provide a warning to an operator that the environment is either unsafe, or at risk of becoming unsafe. A warning may take the form of active audible or visual indications, as well as labels and placards. Audible warnings, such as alarms, could provide an effective warning for operators who have an obstructed line of sight to a visual warning, or have vision problems that may prevent the proper interpretation of a visual warning. Such an alarm would need to have an appropriate sound pressure level (SPL) to attract the attention of the operator, but not so loud as to form an annoyance or health hazard to adjacent workers. The frequency of the alarm should be established as to allow an operator to determine the location of the emitter, for there may be several trailers in the vicinity. Visual warnings such as lamps and numerical displays may be employed to give the operator information about the cargo hold environment. A simple indicator can be used to show whether the hold is safe or unsafe; such an indicator should use both color (red and green, for example) and position (the two colors of indicator should not share the same location) to allow a user with normal visual acuity or one with color deficiency to properly interpret the warning. Alphanumerical information can also be presented to the operator, although training may be required to properly interpret the data. Although not an E/E safety mechanism, labels and placards can be an effective means of informing an operator of potential hazards. Information concerning the warning function can be transmitted via the serial bus or discrete signal paths. These techniques may use electrical or optical signals. False warnings should be avoided, as they can lead to operators disregarding the information provided by the system and a resultant degradation of the effectiveness of this mechanism.

Guarding against Unsafe O2. With some combination of O2 monitoring, valve monitoring, and occupant detection in place, it is possible to provide a guard to prevent an operator from entering an environment that is potentially unsafe. One form of a guard consists of a commercially-available electromagnetic actuator in combination with a cable (or alternatively, a fabric net). The cable is strung across the cargo hold entrance, with one end anchored to the cargo hold structure and the other end secured by the actuator. When unpowered, the actuator prevents the release of the cable and thus does not allow the entry of a properly-trained operator. The system will power the solenoid to release the cable only when the cargo hold door is open, measured O2 levels are deemed safe, and the nitrogen solenoid valves are unpowered and determined to be closed. A standard mechanical door lock can also serve as a form of a manually-operated guard. The guard must be constructed in such a manner as to allow a trapped operator to leave the cargo hold if necessary. This may be accomplished via the mechanical design of the guard device, or electronically releasing the guarding device upon activation of the E-stop or occupant detection device. If this task is accomplished via E/E means, then the function must be provided via a system with the appropriate ASIL. Information concerning the guarding function can be transmitted via the serial bus or discrete signal paths. These techniques may use electrical or optical signals. Improper operation should be avoided, as they can lead to operators disregarding the safety function provided by the system and a resultant degradation of the effectiveness of this mechanism.

Inhibiting Release of LN2. A system mechanism that inhibits LN2 release may be implemented by ensuring that the electromechanical solenoid valves are not powered. To ensure that this is the case, multiple sources of high-side and low-side power may be utilized to provide additional assurance that the valve has not become inadvertently powered. The release of LN2 may also be inhibited by a manual valve. In this case, operator intervention would be required in order to activate the safety mechanism. A manually-actuated mechanism by which to inhibit the release of LN2 by deactivating the system may be utilized to allow a trapped operator to avoid harm. This mechanism should be easily manipulated (such as a large pushbutton as typically employed by emergency stop switches), and should be backlit to allow a user to quickly locate it in a darkened trailer. A luminous ("glow-in-the-dark") label can assist in locating the E-stop switch.

Safety mechanisms. While the system is capable of creating an environment that is potentially depleted of O2, the oxygen levels may be periodically monitored within the fault tolerant safety interval.

The O2 monitoring function can be decomposed and allocated to two independent modules or subsystems.

Communication of the O2 values can be decomposed and allocated to two independent means, such as CAN bus (or similar serial communications bus) and discrete digital or analog I/O lines. At least one method may be capable of placing O2 values onto the CAN bus (or similar serial communications bus).

If the O2 monitoring function is implemented with functionally-identical sensors, a minimum of three sensors per zone may be used. A minimum of two sensors may be used if they avoid common-cause failures.

Faults of the O2 monitoring function may be diagnosed within ⅓ the period of the fault tolerant time interval in order to allow the system to respond with the fault tolerant time interval. For systems with a sensor count of N, if less than (N/2)+0.5 sensors per zone are determined to be operating properly, the O2 monitoring system may default to a safe state (O2 levels assumed to be unsafe).

Faults of the O2 monitor function may be transmitted via the communication means used for the module that has detected the fault.

If an O2 monitoring fault is detected, the system may display this information via the ECP HMI and the DLP. The outcome of the fault (operation at a reduced level of reliability, or inhibited operation) may be communicated if possible.

If barometric compensation is determined to be necessary for proper O2 sensing, this function may be implemented via a system with the same level of safety integration level as the O2 monitoring system.

The barometric compensation function may be decomposed and allocated to two independent means (one each per means of O2 monitoring).

If O2 warm-up is required, then the monitoring function may assume that the O2 value is unsafe during the warm-up interval.

The operator protection mechanism may consist of a guarding system and a warning system. The function may be decomposed between these two mechanisms in a manner that accommodates users with vision or hearing deficiencies, as well as distractions or impediments that may be reasonably expected during typical use.

A guard system may be provided to prevent the operator from entering the cargo hold when the O2 level is not safe. When the cargo hold is determined to be safe for entry, the guard may unlock upon user request.

The guard mechanism may provide a discrete output signal of its status to the warn mechanism for the purpose of providing a rational check.

The guard mechanism may receive a discrete input signal from the warn mechanism for the purpose of providing a rational check. If the warn system output does not correlate with the guard system status, the guard may not be released.

A means by which to warn the operator is be provided.

This mechanism may have an audible alert that is sufficiently loud to be heard in the average usage environment (such as a warehouse loading dock). This function may be implemented with a system having no assessed level of functional safety, as this is not considered the primary means of provision an operator warning. A door switch may be used to deactivate this system when the cargo hold door is closed.

A visual warning system using both color and position to provide a clear indication of "safe" (green lamp) or "not safe" (red lamp) may be implemented. Labeling of the lamps may be provided to assist operators with vision color deficiencies. This system may be in operation whenever the system is capable of creating an environment that is potentially depleted of O2, and may not be defeated when the cargo hold door is closed.

The warn mechanism may provide a discrete output signal of its status to the guard mechanism for the purpose of providing a rational check.

The warn mechanism may receive a discrete input signal from the guard mechanism for the purpose of providing a rational check. If the warn system output does not correlate with the guard system status, the warning system may indicate a potentially unsafe environment, and a message may be transmitted via the CAN bus (or similar serial communications bus) indicating that this error exists.

Internal faults of the warning system may result in the warning system indicating that O2 level is potentially unsafe. A message may be transmitted via the CAN bus (or similar serial communications bus) indicating that this error exists.

If warning faults occur, the system may display this information via the ECP HMI and the DLP. The outcome of the fault (operation at a reduced level of reliability, or inhibited operation) may be communicated if possible.

The guard and warn functions may each use independent means of receiving O2 information.

A CAN bus (or similar serial communications bus) may be provided for the purpose of communicating O2 values from the O2 sensing system to the warning system.

Labeling and placards may be provided near the cargo hold entry and on the gate locking mechanism (cable) to warn operators of this hazard.

A means to prevent the system from dispensing LN2 into an occupied cargo hold may be provided.

The door switch function may be periodically monitored, and LN2 dispensing may be inhibited whenever the door is not conclusively determined to be closed.

Any door switch faults may be detected, and the system returned to a safe state within the fault tolerant time interval.

The guard system function may be periodically monitored, and LN2 dispensing may be inhibited whenever the guard device is not conclusively determined to be locked in place.

Any guard device faults may be detected, and the system returned to a safe state within the fault tolerant time interval.

The valve control function may be monitored by the system. Any faults may be detected, and the system returned to a safe state within the fault tolerant time interval.

A device to prevent the system from operation (such as a lockable main power switch or lockable manual valve) may be provided to prevent the system from unintentional operation during storage or maintenance.

When the system is in standby mode, the temperature sensors may be periodically monitored. A significant drop in temperature may result in the system coming out of standby mode.

A manually-actuated mechanism by which to inhibit the release of LN2 by deactivating the valve mechanism, or E-stop, may be provided.

The E-stop mechanism may include a set of normally-closed (N/C) contacts that will open upon activation and interrupt power to the valves. The E-stop mechanism may include a set of contacts that may be periodically monitored by the warning system (ASIL A).

Upon receiving a CAN message (or message via a similar serial communication bus) indicating E-stop actuation, valve operation may be immediately ceased. The system shall sound its external alarm and display a message.

This E-stop mechanism may be backlit for ease of location by an untrained operator. A luminous ("glow-in-the-dark") label may be provided near the E-stop mechanism for ease of location by an untrained operator. This E-stop mechanism may be implemented by a latching pushbutton, sized to be easily manipulated by an untrained operator. The button may be recessed into the trailer sidewall to prevent damage or accident operation. This E-stop mechanism may be diagnosed for faults by the warning system. Any loss of correlation between multiple sets of contacts may result in a message being sent via the CAN bus (or similar serial communications bus). This error may result in the system returning to the safe state, and the system may display this information.

The cargo door latch may be implemented in such a manner as to allow the door to be unlocked and opened from the interior of the trailer.

A label or placard may be provided near the cargo hold opening to warn operators of this hazard and to instruct the operator to check the cargo hold for the presence of other occupants prior to closing the cargo hold door.

A vessel compliant with applicable geographical and industry standards may be utilized to reduce the risk of rupture during a normal use and maintenance to a reasonable level.

A manual shutoff valve may be provided to allow a trained maintenance technician to isolate the vessel from other system elements. This valve may have a means by which to lock out the valve.

A label or placard may be provided near the vessel to warn operators of hazards related to ventilation function and the potential for injury due to burst or rupture.

The system may monitor the valve pressure level. This measurement may be communicated via the system CAN bus (or similar serial communications bus).

The system may warn the operator of an unsafe vessel pressure level.

The HMI may be utilized to provide a visual warning if the maximum vessel pressure level is exceeded.

The external alarm may be sounded if the maximum vessel pressure level is exceeded.

A manual shutoff valve may be provided to allow an emergency responder to isolate the vessel from other system elements.

A "burst disk" may be present. There may be no means (automatic or manual) by which to isolate the burst disk from the vessel.

The trailer body may provide a means by which to ventilate the cargo hold to the outside environment at a rate sufficient to prevent the unacceptable rise of pressure.

For trailer equipped with outware-swinging doors, a label or placard may be placed on the exterior of the door near the latch to warn of this potential hazard.

Odorant: The ability of an operator to perceive the unintended release of LN2 may be improved via the additional of an odorant, such as sulfur dioxide (SO2).

Exemplary embodiments of a system and methods for cooling interior volumes of cargo trailers are described above in detail. The system and methods are not limited to the specific embodiments described herein, but rather, components of the system and/or steps of the method may be utilized independently and separately from other components and/or steps described herein. For example, the system may also be used in combination with other temperature control systems and methods, and is not limited to practice with only the cooling system as described herein. Rather, an exemplary embodiment can be implemented and utilized in connection with many other temperature control applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A system for controlling a temperature within an interior volume of a cargo trailer, comprising:
a fluid distribution assembly including:
at least one spray nozzle assembly configured to channel a flow of cryogenic cooling fluid into the interior volume of the cargo trailer; and
at least one control valve coupled to the at least one spray nozzle assembly for selectively channeling the flow of cryogenic cooling fluid through the spray nozzle assembly; and
a monitoring system operatively coupled to the fluid distribution assembly for controlling the flow of cryogenic cooling fluid into the interior volume, the monitoring system comprising:
a display device for displaying information to a user;
a user input device for allowing the user to command a desired cooling profile from a set of available cooling profiles, each available cooling profile including a cooling ramp rate, the set of available cooling profiles includes a plurality of pre-set profiles and at least one user-defined profile;
at least one temperature sensor configured to sense an ambient temperature within the interior volume; and
a processor programmed to:
initiate a cooling operation including channeling the flow of cryogenic cooling fluid into the interior volume;
receive the desired cooling profile from the user input device;
determine a flow rate of cryogenic cooling fluid based on the cooling ramp rate in the desired cooling profile and responsively operate the fluid distribution assembly to channel the flow of cryogenic cooling fluid into the interior volume at the determined flow rate;
monitor the ambient temperature within the interior volume during operation of the fluid distribution assembly and operate the at least one control valve to adjust the flow rate of cryogenic cooling fluid to reduce a difference between an actual ambient temperature and a desired ambient temperature as a function of the desired cooling profile.

2. A system, as set forth in claim 1, wherein the desired cooling profile includes at least one of temperature setpoints, desired cooling rates and pre-set profiles.

3. A system, as set forth in claim 1, wherein the interior volume is divided into a plurality of zones, wherein the at least one spray nozzle assembly is a plurality of spray nozzle assemblies, each zone including at least one of the plurality of spray nozzle assemblies.

4. The system as set forth in claim 3, wherein the fluid distribution assembly comprises:
a cryogenic fluid supply tank coupled to the cargo trailer for storing a volume of cryogenic fluid; and,
a fluid conduit coupled between the cryogenic fluid supply tank and each one of the plurality of spray nozzle assembles for channeling cryogenic fluid from the cryogenic fluid supply tank to the spray nozzles, the fluid distribution assembly includes a plurality of control valves, each one of the control valves configured to selectively channel cryogenic fluid to a respective one of the plurality of spray nozzles.

5. The system, as set forth in claim 4, including a plurality of temperature sensors, each temperature sensor being located within a respective zone, wherein the processor is programmed to operate the fluid distribution assembly to selectively channel cryogenic fluid into the each zone of the interior volume as a function of the sensed temperature in the respective zone.

6. The system, as set forth in claim 5, the processor being programmed to determine a flow rate of cryogenic fluid being channeled into each zone of interior volume as a function of a predefined rate of cooling and the sensed interior temperature, channel the flow of cryogenic fluid into the respective zone at the determined flow rate, determine an actual rate of cooling as a function of the sensed interior temperature monitored over a predefined period of time, and adjust the flow rate of cryogenic fluid being channeled into the respective one to reduce a difference between the actual rate of cooling and the predefined rate of cooling.

7. The system, as set forth in claim 6, the controller is programmed to determine the flow rate of cryogenic fluid as a function of one of the sensed interior temperature, an exterior trailer temperature, and an insulation value of the cargo trailer.

8. The system, as set forth in claim 1, wherein the desired cooling profile is selected from a plurality of predefined cooling profiles.

9. The system, as set forth in claim 8, wherein the system further comprises an external control panel configured to allow a user to select the desired cooling profile from the plurality of predefined cooling profiles.

10. The system, as set forth in claim 1, wherein the established desired cooling profile is configured to control the temperature within each zone.

11. A method for controlling a temperature within an interior volume of a cargo trailer using a system, the system including a fluid distribution assembly, a monitoring system, at least one temperature system and a processor, the fluid distribution assembly includes at least one spray nozzle assembly configured to channel a flow of cryogenic cooling fluid into the interior volume of the cargo trailer and at least one control valve coupled to the at least one spray nozzle assembly for selectively channeling the flow of cryogenic cooling fluid through the spray nozzle assembly, the monitoring system operatively coupled to the fluid distribution assembly for controlling the flow of cryogenic cooling fluid into the interior volume, the monitoring system at least one temperature sensor configured to sense an ambient temperature within the interior volume, the method including the steps of:
initiating a cooling operation including channeling the flow of cryogenic cooling fluid into the interior volume;
allowing a user, using a user input device, to command a desired cooling profile from a set of available cooling profiles, each available cooling profile including a cooling ramp rate, the set of available cooling profiles includes a plurality of pre-set profiles and at least one user-defined profile;
receiving the desired cooling profile from the user input device;
determining a flow rate of cryogenic cooling fluid based on the cooling ramp rate in the desired cooling profile and responsively operating the fluid distribution assembly to channel the flow of cryogenic cooling fluid into the interior volume at the determined flow rate;
monitoring the ambient temperature within the interior volume during operation of the fluid distribution assembly and operating the control valve to adjust the flow rate of cryogenic cooling fluid to reduce a difference between an actual ambient temperature and a desired ambient temperature as a function of the desired cooling profile.

12. A method, as set forth in claim 11, wherein the desired cooling profile includes at least one of temperature setpoints, desired cooling rates and pre-set profiles.

13. A method, as set forth in claim 11, wherein the interior volume is divided into a plurality of zones, wherein the at least one spray nozzle assembly is a plurality of spray nozzle assemblies, each zone including at least one of the plurality of spray nozzle assemblies.

14. A method system as set forth in claim 13, wherein the fluid distribution assembly comprises:
   a cryogenic fluid supply tank coupled to the cargo trailer for storing a volume of cryogenic fluid; and,
   a fluid conduit coupled between the cryogenic fluid supply tank and each one of the plurality of spray nozzle assembles for channeling cryogenic fluid from the cryogenic fluid supply tank to the spray nozzles, the fluid distribution assembly includes a plurality of control valves, each one of the control valves configured to selectively channel cryogenic fluid to a respective one of the plurality of spray nozzles.

15. A method as set forth in claim 14, including a plurality of temperature sensors, each temperature sensor being located within a respective zone, the method including the step of operating the fluid distribution assembly to selectively channel cryogenic fluid into the each zone of the interior volume as a function of the sensed temperature in the respective zone.

16. A method system, as set forth in claim 15, including the step of determining a flow rate of cryogenic fluid being channeled into each zone of interior volume as a function of a predefined rate of cooling and the sensed interior temperature, channeling the flow of cryogenic fluid into the respective zone at the determined flow rate, determining an actual rate of cooling as a function of the sensed interior temperature monitored over a predefined period of time, and adjusting the flow rate of cryogenic fluid being channeled into the respective one to reduce a difference between the actual rate of cooling and the predefined rate of cooling.

17. A method as set forth in claim 16, method including the step determining the flow rate of cryogenic fluid as a function of one of the sensed interior temperature, an exterior trailer temperature, and an insulation value of the cargo trailer.

18. A method, as set forth in claim 11, wherein the desired cooling profile is selected from a plurality of predefined cooling profiles.

19. A method as set forth in claim 18, wherein the system further comprises an external control panel configured to allow a user to select the desired cooling profile from the plurality of predefined cooling profiles.

20. A method, as set forth in claim 11, wherein the established desired cooling profile is configured to control the temperature within each zone.

* * * * *